US006820049B1

(12) United States Patent
Monroe et al.

(10) Patent No.: US 6,820,049 B1
(45) Date of Patent: *Nov. 16, 2004

(54) DATA COLLECTION SYSTEM

(75) Inventors: Daniel R. Monroe, Woodland Park, CO (US); Jeffery E. Turner, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/400,624

(22) Filed: Sep. 20, 1999

(51) Int. Cl.[7] .......................... G06F 9/44; G06F 13/10; G06F 13/12
(52) U.S. Cl. ............................ 703/21; 703/13; 703/14; 703/17; 703/20; 455/422; 455/557; 340/905; 370/352
(58) Field of Search ............................ 703/14, 21, 13, 703/17, 20; 455/422, 557; 340/905; 370/352

(56) References Cited

U.S. PATENT DOCUMENTS

| | | | |
|---|---|---|---|
| 3,656,112 A | 4/1972 | Paull | 340/151 |
| 4,388,690 A | 6/1983 | Lumsden | 364/483 |
| 4,578,540 A | 3/1986 | Borg et al. | 179/2 |
| 4,646,084 A | 2/1987 | Burrowes et al. | 340/870.03 |
| 5,295,178 A | 3/1994 | Nickel et al. | 379/58 |
| 5,302,947 A | 4/1994 | Fuller et al. | |
| 5,418,524 A | 5/1995 | Fennell | |
| 5,434,911 A | 7/1995 | Gray et al. | 379/106 |

(List continued on next page.)

FOREIGN PATENT DOCUMENTS

EP 0849682 6/1998 .......... G06F/13/10

OTHER PUBLICATIONS

Jian Cai and David J. Goodman, "General Parket Radio Service in GSM", Oct. 1997, IEEE Communications Magazine, pp. 122–131.

Morassi et al, "Real Time Simulation of Fax Transmission on the Transparent GSM Data Service", 5th IEEE International Symposium on Personal, Indoor and Mobile Radio Communications, 1994, pp. 944–953.

Bolton, "The Cellular Way to Retrieve data", Transmission & Distribution, 1994, pp. 54, 57, 59.

Murch et al, "Cellular Data Service Over GSM", Telecommunications, 1995, pp. 63–71.

Anonymos, "GSM Modules for Remote Applications", Electronic Times, 1998.

Orr, "Cell Phones Act as Modems", Computer Dealer News, 1994, p. 33.

*Primary Examiner*—Thai Phan
*Assistant Examiner*—Herng-der Day
(74) *Attorney, Agent, or Firm*—Blakely, Sokoloff, Taylor & Zafman LLP

(57) ABSTRACT

A data collection system for transmitting data from user equipment to a user application server over a GSM network is provided. According to an aspect of the invention, a data terminal apparatus is configured to simulate a circuit switched call link to the user equipment, while providing a communications call link to the GSM network over a non-circuit switched call link. According to embodiments described herein, the non-circuit switched call link is achieved via packetizing serial data from the user equipment into short message service messages, or alternatively via general packet radio service messages. As a result of the methods and apparatuses of the present inventions, legacy serial communications equipment can be integrated into a data collection network and remotely monitored without the costs associated with deploying service personnel or more costly circuit switched type equipment and services.

18 Claims, 16 Drawing Sheets

U.S. PATENT DOCUMENTS

| | | |
|---|---|---|
| 5,436,960 A | 7/1995 | Campana, Jr. et al. ........ 379/58 |
| 5,451,938 A | 9/1995 | Brennan, Jr. ........... 340/870.14 |
| 5,461,558 A | 10/1995 | Patsiokas et al. ........... 364/145 |
| 5,475,867 A | 12/1995 | Blum ........................ 455/53.1 |
| 5,481,259 A | 1/1996 | Bane ..................... 340/870.03 |
| 5,493,287 A | 2/1996 | Bane ..................... 340/825.52 |
| 5,537,458 A | 7/1996 | Suomi et al. ................. 379/59 |
| 5,559,870 A | 9/1996 | Patton et al. ............... 379/107 |
| 5,590,179 A | 12/1996 | Shincovich et al. ........ 379/107 |
| 5,617,084 A | 4/1997 | Sears |
| 5,619,508 A | 4/1997 | Davis et al. ................. 370/495 |
| 5,631,636 A | 5/1997 | Bane ..................... 340/825.69 |
| 5,640,155 A | 6/1997 | Springer ............... 340/870.28 |
| 5,663,933 A | 9/1997 | Eitrich ....................... 368/119 |
| 5,673,252 A | 9/1997 | Johnson et al. ............. 370/94.1 |
| 5,684,472 A | 11/1997 | Bane ..................... 340/870.02 |
| 5,726,646 A | 3/1998 | Bane et al. ............. 340/870.03 |
| 5,726,764 A | 3/1998 | Averbuch et al. |
| 5,778,024 A | 7/1998 | McDonough ............... 375/216 |
| 5,809,415 A | 9/1998 | Rossmann .................. 455/422 |
| 6,014,089 A | 1/2000 | Tracy et al. ........... 340/870.02 |
| 6,134,608 A | 10/2000 | Jacober et al. |
| 6,301,488 B1 | 10/2001 | Alos et al. |
| 6,363,335 B1 * | 3/2002 | Monroe et al. ............. 340/905 |
| 6,384,739 B1 * | 5/2002 | Roberts, Jr. ................. 340/905 |
| 6,418,324 B1 | 7/2002 | Doviak et al. |
| 6,442,625 B1 | 8/2002 | Robinson et al. |

* cited by examiner

DATA COLLECTION SYSTEM

CROSS REFERENCE TO RELATED APPLICATIONS

This application is related to U.S. patent application Ser. No. 09/400,623, now U.S. Pat. No. 6,363,335, entitled, "COMMUNICATIONS BRIDGE FOR CIRCUIT SWITCHED DATA TRANSFER SIMULATION", and Ser. No. 09/398,724, entitled, "DATA TERMINAL APPARATUS", both filed on the same day herewith and which are incorporated herein by reference in their entirety.

FIELD OF THE INVENTION

This application relates to the field of wireless transfer technology, and apparatus using simulated circuit collection methods and apparatus using simulated circuit switched technology.

BACKGROUND

Monitoring the residential, commercial, an d industrial complexes of buildings throughout the United States are a variety of user equipment. Examples of such user equipment include meter reading devices that measure consumption of various utility commodities such as natural gas, electricity and water via an electrical or electro-mechanical transducer. The meter reading devices are typically analog devices that record either a first reading and a second reading of the measured commodity over a period of time, or, alternatively, a cycling total (that is, a running total that recycles after a certain number is reached).

Generally, service personnel for the utility provided physically appear at or near the meter reading device to record consumption of the commodity each month. The recorded consumption from the meter reading device is then fed into a database used for billing purposes which in turn generates an invoice for the consumer based on user's consumption of the measured commodity.

In urban areas, the number of meter reading devices that need to be recorded is tremendous. Although the overhead associated with sending service personal to a desired location can be amortized by consolidation of meter reading devices at a particular location, for example, in a high-density residential development such as an apartment complex, the cost can still be significant. In rural areas, however, the cost is higher as meter reading cannot generally be amortized over a number of meter reading devices read at a single location.

Various techniques are employed by utility companies to reduce the cost of sending service personal to a physical site.

For example, a simple method is the use of stochastic techniques for extrapolating a measured quantity for a current reading from one or more past values or a moving or seasonal average. This technique is designed to reduce the frequency of meter reading. A disadvantage, however, is the fact that the extrapolated reading can be greatly under or over the actual consumption, such as the case where a consumer is simply not present and no services are used, or when an unusual weather pattern occurs and consumption is significantly increased.

Another technique is the use of radio-based meter reading devices. For example, each meter reading device includes a radio, the radio capable of broadcasting a meter reading to a nearby receiver. In the Middle East for example, such a system is often employed because service personnel are frequently denied access to a property when the property owner (a man) is not home. The radio based meter reading devices allow service personnel to drive near the radio meter reading device with a receiver device to read the meter. With such technology service personnel do not need to enter the property. An advantage of such a system is that, in rural areas, the time it takes service personnel to read the meters can be reduced.

For example, one system might require service personnel to physically drive by or near a collection of meter reading devices in order to communicate with the devices. The data collected in the "drive-by" would be later uploaded to a centralized data collection system.

Another solution might include periodic stations that collect wireless data from the devices. The periodic stations, in turn could include a landline modem that communicates with the centralized data collection system by way of circuit switched calls. Such a solution offers an alternative to deploying service personnel, however, setting up phone lines to service the periodic stations can also be expensive. Moreover, circuit switched calls can also be expensive.

The problems mentioned above are exacerbated by deregulation of the utilities industry in the United States. It is now possible for several different suppliers of electricity to service a single metropolitan area. This, in turn, results in a non-contiguous patchwork of service areas that service personnel may have to monitor. No longer can it be assumed that all users in a particular geographic area receive electrical power from a single service provider. Indeed, on a single residential block every household may have a different service provider. Moreover, the alleged ease with which a consumer may switch service providers further complicates the circumstance. Accordingly, the ability to amortize the costs of collecting usage measurements is reduced.

SUMMARY OF THE INVENTION

A data collection system for transmitting data from user equipment to a user application server over a GSM network is provided. According to an aspect of the inventions, a data terminal apparatus is configured to simulate a circuit switched call link to the user equipment, while providing a communications call link to the GSM network over a non-circuit switched call link.

According to embodiments described herein, the non-circuit switched call link is achieved via packetizing serial data from the user equipment into short message service messages, or alternatively via general packet radio service messages. As a result of the methods and apparatuses of the present inventions, legacy serial communications equipment can be integrated into a data collection network and remotely monitored without the costs associated with deploying service personnel or costly circuit switched type equipment and services.

DESCRIPTION OF THE PREFERRED EMBODIMENTS

A method and apparatus for circuit switched data transfer simulation is provided. According to an aspect of the inventions, a communications bridge (or interface) is provided that deceives a data collection device into believing that circuit switched communications are being performed. In a presently preferred embodiment, communications are actually performed by way of GSM short messaging services (hereinafter "SMS").

According to one embodiment of the present inventions, the communications bridge is implemented by way of specially configured electrical hardware and software. However, according to another embodiment, the communications bridge is implemented by way of functionality added to an application layer of a GSM protocol stack on existing GSM modem hardware. Both embodiments are described herein.

Operational Overview

Figure 13A:
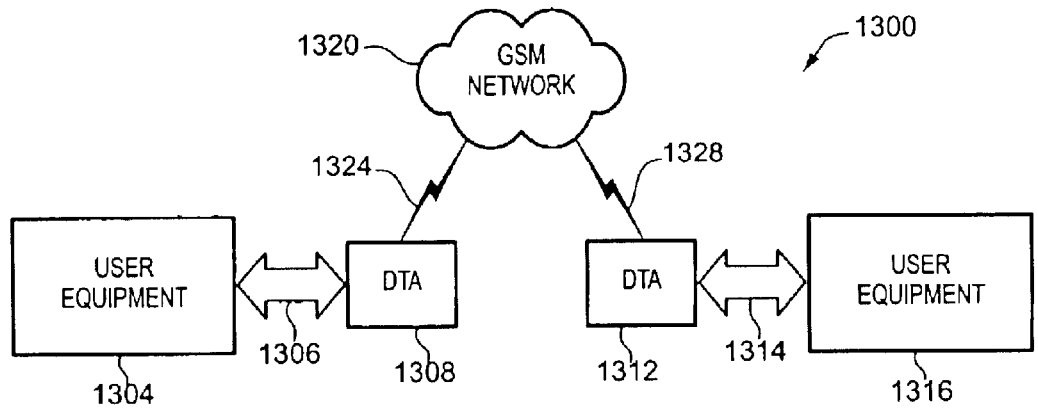
FIG. 13A is a block diagram of a system employing the present inventions.

FIG. 13A is a block diagram of one embodiment of a system 1300 employing the present inventions. User equipment 1304 is a data collection device, such a meter reader collection station that receives data from a number utility meters. User equipment 1304 is communicatively coupled (e.g., by a serial data interface 1306) to a data terminal apparatus 1308, which functions as a communications bridge. Data terminal apparatus 1308 is configured to communicate with a GSM network 1320 over a wireless interface (or "over-the-air" interface) 1324, preferably by way of a standard GSM modem which is a component of the data terminal apparatus 1308. For now, the left side of the GSM network 1320 will be called, for convenience, the originator equipment. The commands described below are preferably implemented from a modified Hayes AT command set.

To the right of GSM network 1320, and also linked by a wireless interface 1328, is a similar data terminal apparatus 1312 which is also communicatively coupled (e.g., by a serial data interface 1314) to user equipment 1316. User equipment 1316 can include a second data collection station or other device for analyzing or relaying communications from the originator equipment. For convenience, the right side of the GSM network 1320 will be referred to as receiver equipment. Note that receiver equipment does not have to mirror the originator equipment, for example, the receiver equipment does not have to be coupled to the GSM network 1320 by way of a wireless interface 1328 and can instead be coupled by way of physical network connections.

Figure 13B:
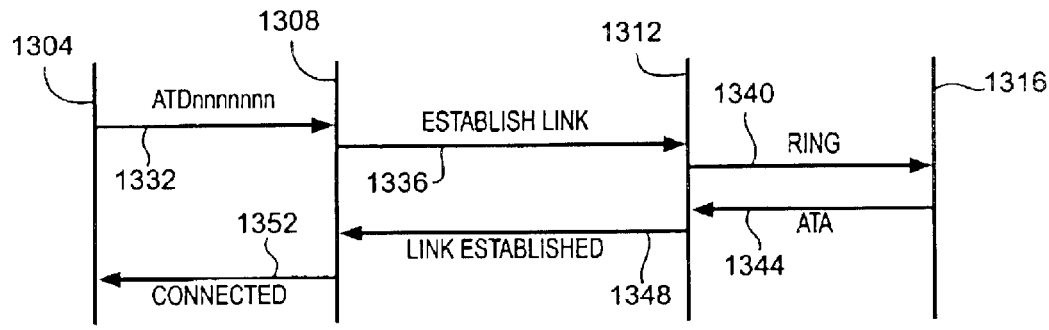
FIG. 13B is a flow diagram showing a simulated circuit switched call set-up.
Figure 13C:
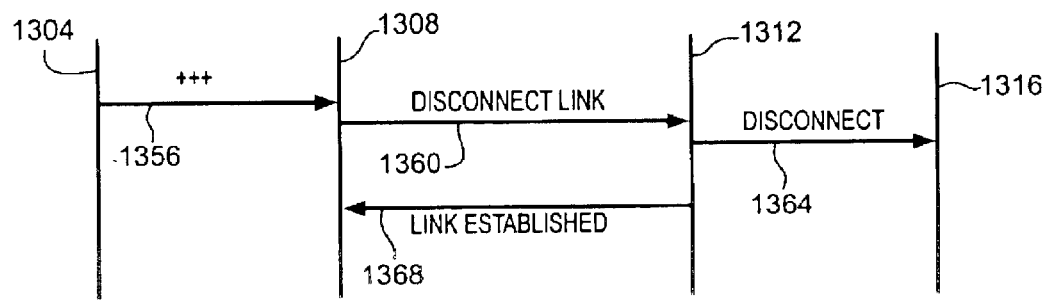
FIG. 13C is a flow diagram showing a simulated circuit switched call tear down.

FIGS. 13B–C depict a call setup and call tear down protocol for circuit switched call simulation. According to one embodiment, neither the originator user equipment 1304 nor the receiver user equipment 1316 will be aware that a non-circuit switched call was made. The data terminal apparatuses 1308 and 1312 simulate circuit switched call response to the user equipment and thus make the fact that a non-circuit switched exchange was performed transparent.

Turning first to FIG. 13B, it is aligned with FIG. 13A and depicts a flow diagram for a simulated circuit switched call setup. Starting from user equipment 1304, an ATD command 1332 is issued and serially passed to the data terminal apparatus 1308 over the serial data interface 1306. The communications bridge handles the incoming ATD command 1332 and sends an SMS establish link message 1336 to the wireless radio. According to one embodiment, the data terminal apparatus and user equipment negotiate flow control so as to prevent input buffer overflows from data being transferred from the user equipment 1304 to the data terminal apparatus 1308.

The wireless radio transmits the SMS establish link message 1336 over the wireless interface 1324 to the GSM network 1320. The GSM network 1320 routes the SMS establish link message 1336 to the receiver wireless local loop 1328. At the receiver wireless local loop 1328, the SMS establish link message 1336 is then routed to data terminal apparatus 1312, which receives the message at its wireless radio and then handles the message with its communications bridge. The communications bridge examines the message and notifies the user equipment 1316 of an incoming call with a ring indicator 1340.

The data terminal apparatus 1308 communications bridge preferably keeps the phone number active for five minutes. This is to accord sufficient time to receive an acknowledgment of the SMS establish link message 1336 from the user equipment 1316.

According to one embodiment, the AT command "ATA" (shown as ATA command 1344) is passed from the user equipment 1316 to the data terminal apparatus 1312. The data terminal apparatus 1312 then sends an SMS link established message 1348 to the data terminal apparatus 1308. Upon receipt of the SMS link establish message 1348, the data terminal apparatus 1308 communications bridge sends a connect message 1352 to the user equipment 1304.

Note that if more than one SMS establish link message 1336 is received from the GSM network 1320 by the data terminal apparatus 1312 before an ATA command 1344 is received from the user equipment 1316, then the data terminal apparatus 1312 communications bridge responds to the most recent SMS establish link message 1336.

Once the SMS link is established, data can be transferred between the user equipment 1304 and the user equipment 1316 over via short messaging services routed over the wireless local loop(s) by the data terminal apparatuses 1308 and 1312.

With a virtual link between the originator equipment and the receiver equipment, data can be passed as if a regular circuit switched call is being performed. The operation is transparent to the user equipment, as the data terminal apparatus communications bridge handles all data packetization, handshaking, sequencing and error correction required by the particular application in which the equipment is employed.

Now turning to FIG. 13C, it is also aligned with FIG. 13A. FIG. 13C depicts a call link tear down 1350 flow diagram for a simulated circuit switched call. According to one embodiment, the communications bridge in the data terminal apparatus 1308 waits approximately ten minutes for data or commands from the user equipment 1316. If no data or commands are received in such time frame, then the call is considered "dropped". However, receiving an escape sequence also causes the call to be dropped.

First, the escape sequence 1356 is received by the data terminal apparatus 1308. An SMS disconnect link message 1360 is then transmitted over the wireless interface 1324 by the wireless radio in data terminal apparatus 1308.

The GSM network 1320 receives the transmitted SMS disconnect link message 1360 and routes it over wireless interface 1328 to data terminal apparatus 1312. Data terminal apparatus 1312 receives the SMS disconnect link message 1360 and it is processed by the communications bridge. The communications bridge, in turn, sends a disconnect indicator 1364 to the user equipment 1316 and then a link disconnected message 1368 back to data terminal apparatus 1308. When the link disconnect message 1368 is received by the data terminal apparatus 1308, the wireless radio drops the link.

Although described above with reference to an SMS embodiment, according to another embodiment, the communications bridge simulates circuit switched calls by way of general packet radio services ("GPRS"). The call setup and tear down are substantially similar to the methods described above (and below), however, rather than supplying a phone number after AT command "ATD", an internet protocol address is supplied (e.g., "ATD114.32.0.108"). Once a connection is established, data packets passed over GPRS are formatted similar to the data packets over SMS.

Another difference between the SMS and GPRS approaches is that rather than having a 140 byte packet length and a baud rate of less than 300 baud (SMS), GPRS packets can have a 1500 Kbytes packet length, moreover, a much higher over-the-air rate, 170 Kbaud, is also possible. The addition of larger data packets and increased bandwidth allows easier integration of additional functionality into the communications bridge, such as relaxed flow control, handshaking for improved quality of service, multi-bit encryption, and other error recovery techniques (e.g., parity checks, CRC, etc.). While such features are possible in the SMS embodiment, the small packet size may require packet sequencing number and other header information to be sent with each packet, which would further slow communications.

One example of a system implementing the general architecture described above is a home automation application running on a personal computer (user equipment 1304), that interfaces data terminal apparatus 1308 via interface 1306. At the opposite end of the home automation application resides a home network control center embodied in user equipment 1316. The home automation application provides monitoring and control services to the home network control system, whereas the home network control system controls, for example, heating, ventilation, air conditioning, and security for a user's home. Commercially available home network control systems include Echelon Corporation's LON-WORKS™ technology.

Another example of a system implementing the general architecture depicted in FIG. 13A is an automatic meter reading system. In such a system, user equipment 1304 is an automatic meter reader collection station that receives measurements of consumption of a metered commodity, such as electrical power or natural gas, for one or more automatic meter readers. Data measured by the automatic meter readers is sent to the collection station where it is in turn fed to the data terminal apparatus 1308. User equipment 1316 can be a utility device that either actively polls the collection station via data terminal apparatus 1312, or passively receives measured data from the data collection station via data terminal apparatus 1312.

Physical Packaging

Figure 1:
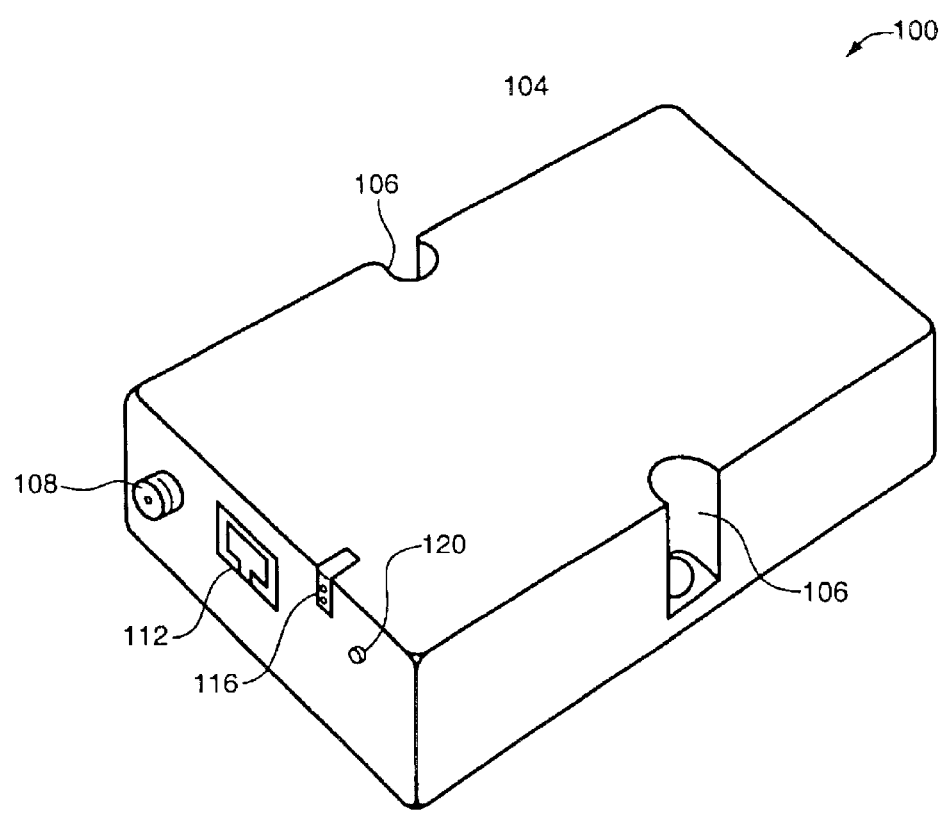
FIG. 1 depicts a physical packaging of an embodiment of the present inventions.

FIG. 1 depicts a perspective view of an embodiment of the physical packaging of a data terminal module ("DTM") 100. The data terminal module 100 includes an enclosure 104 that surrounds a data terminal sub-assembly ("DTSA"). The data terminal sub-assembly (not shown) is a circuit card that is configured to receive a preprocessor and wireless radio, which are described in detail below.

A coaxial cable connector 108, a standard DB-9 connector 112, a power connector 116 and a power indicator 120 are shown on the on the enclosure 104. Each is connected, internally, to the data terminal sub-assembly. The coaxial cable connector 108 is configured to receive an antenna for the wireless radio. Two mounting sleeves 106 are notched into the enclosure 104. The mounting sleeves 106 provide a path for connectors that are used to secure the data terminal module 100 to a desired location.

Figure 2:
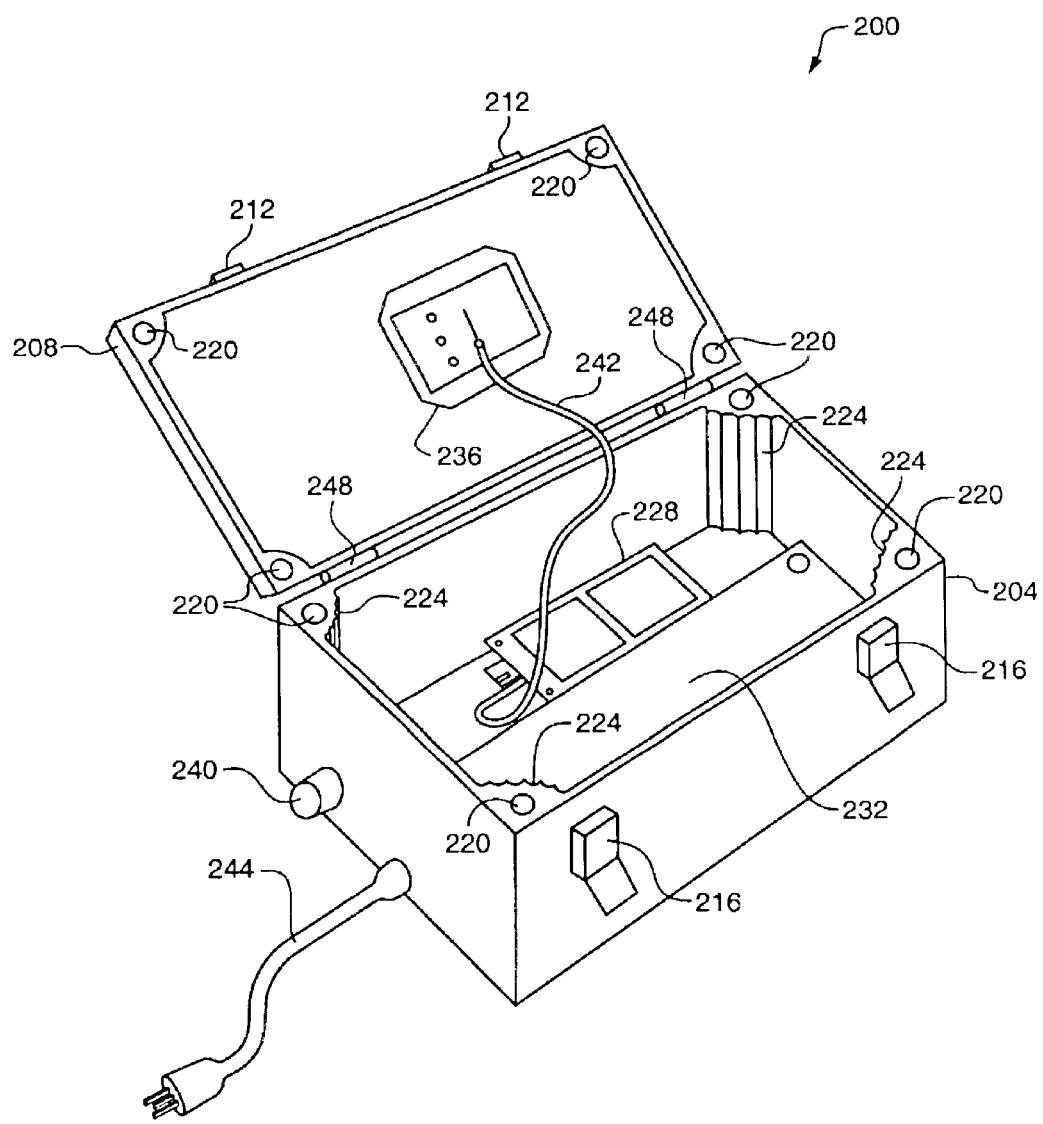
FIG. 2 depicts physical packaging of an alternative embodiment of the present inventions.

FIG. 2 depicts a perspective view of an embodiment of the physical packaging of a data terminal unit ("DTU") 200. The data terminal unit 200 includes a two-part enclosure. Case 204 carries electronics modules, such as data terminal sub-assembly 228 and power supply 232. A heat sink 224 is placed at each inside corner of case 204 and is used to dissipate heat generated by the electronics modules. The outside surface of case 204 comprises a coaxial cable receptacle 240, and an A/C power cord 244. Also shown on the outside surface of case 204 are two hinged latches 216.

The second part of the enclosure for data terminal unit 200 is a cover 208. Cover 208 is connected to case 204 via hinges 248, and is configured to sealably enclose the electronics modules carried in the case 204. Latch connectors 212 receive hinged latches 216 to assist in this end. The cover 208 and the case 204 also include a number of connector receptacles 220 for additional protection. A patch antenna 236 is mounted to the cover 208. The patch antenna 236 is coupled to the wireless radio contained in the data terminal sub-assembly 228.

Details of a presently preferred patch antenna 236 and embodiments of an enclosure are described in U.S. patent application Ser. Nos. 09/316,457, entitled "CAPACITIVE SIGNAL COUPLING DEVICE", and 09/316,459, entitled "RADIATING ENCLOSURE", both filed May 21, 1999, which are incorporated herein by reference in their entirety.

According to an alternative embodiment, special electrical hardware is not employed in either the data terminal module 100 or data terminal unit 200. In such an embodiment, application software is added to a standard GSM modem software stack. Accordingly, the data terminal apparatuses can be a specially configured GSM modem.

Preprocessor Embodiment

Figure 3:
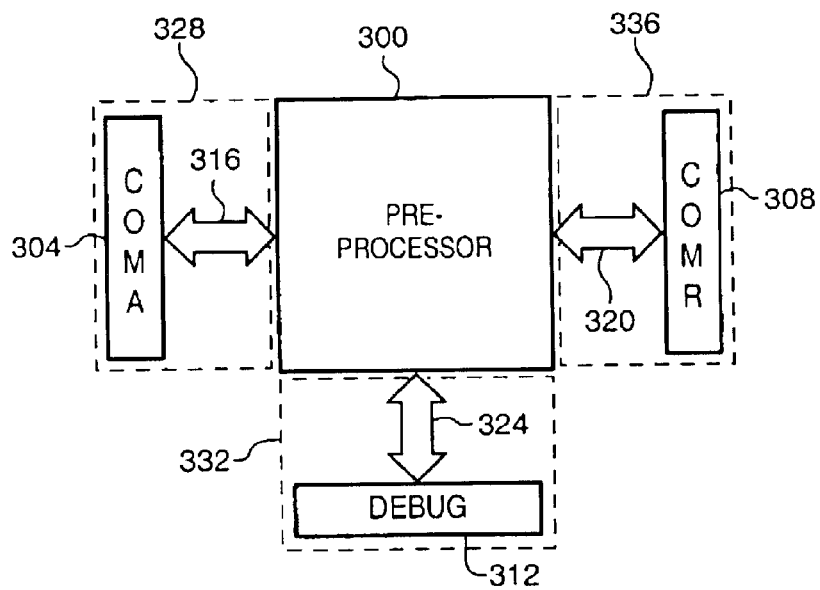
FIG. 3 is a block diagram of a preprocessor unit and interface architecture.

FIG. 3 is a block diagram of the preprocessor architecture. Preprocessor 300 is coupled to a first interface 328, a second interface 336, and a third interface 332. Preferably, each of the interfaces includes an RS-232 port having a DB-9 or equivalent physical connector. COMA 304, COMR 308 and DEBUG 312, for example, can be implemented with such connectors. Communication lines 316, 320, and 324 communicatively couple the physical connectors to the preprocessor 300.

According to one embodiment, the first interface 328 connects to user equipment (e.g., telemetry equipment, automatic meter reading equipment, meter reader concentration point, utility meter control system, substation monitoring equipment, etc.). The user equipment is configured to collect measured data that monitors external activity. The second interface 336 is a physical connection to a wireless radio, more specifically a GSM modem having a baud rate of approximately 9600 bps or higher. The third interface 332 is preferably an open serial interface capable of receiving a terminal or test equipment for debugging and configuration purposes. According to one embodiment, the debug port services can be physically accessed through the first interface 328.

Each RS-232 connector 304, 308 and 312 is shown coupled to the preprocessor 300 by unique communication lines 316, 320 and 324. This is for simplicity and to represent a unique address for each communication port or serial interface. In fact, a single address and data bus can support the communication ports.

Figure 4:
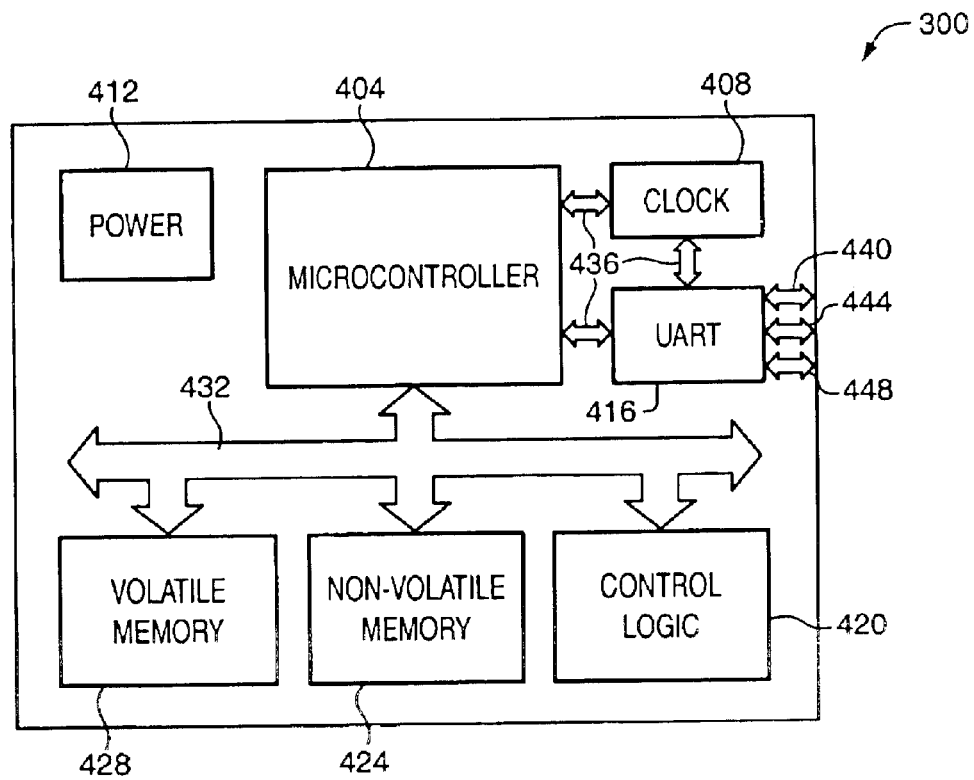
FIG. 4 is a hardware schematic of the preprocessor unit.

FIG. 4 is a hardware schematic a presently preferred embodiment of the preprocessor 300. The preprocessor 300 comprises a microcontroller 404, preferably Dallas Semiconductor part no. DS80C323 (16 MHz), a universal asynchronous receiver transmitter ("UART") 416, preferably an Exar Corporation part no. ST16C2450 (8 MHz), a nonvolatile memory 424, preferably Advanced Micro Devices part no. 29LV001B-70JC, and a volatile memory 428, preferably IDT part no. 71V256SA-12PZ. Additional control logic 420 is desired, such as gate arrays and TTL logic, for maintaining timing (e.g., a clock divider for the UART 416), buffering, and logic levels. Power circuitry 412 provides power to the preprocessor 300 and any peripheral device (e.g., a wireless radio), and a crystal oscillator 408 (16 MHz) provides a clock signal. A main bus 432 communicatively couples the microcontroller 404, with memories 424 and 428, as well as control logic 420. The main bus 432 includes both data, address and control lines, such as the same control lines 436 interconnecting the clock 408, the UART 416 and the microcontroller 404.

Additional lines 440, 444 and 448 are shown connected to UART 416. These lines are for the first interface 328, second interface 336, and third interface 332. Interrupts are received by the UART 416, over lines 440, 444, and 448, which trigger exception/interrupt algorithms in the microcontroller 404. A portion of the volatile memory 428 is used as a 1024 byte memory buffer for each input queue in UART 416 (thus, if two interfaces are used, 2048 bytes of memory are used).

Figure 5:
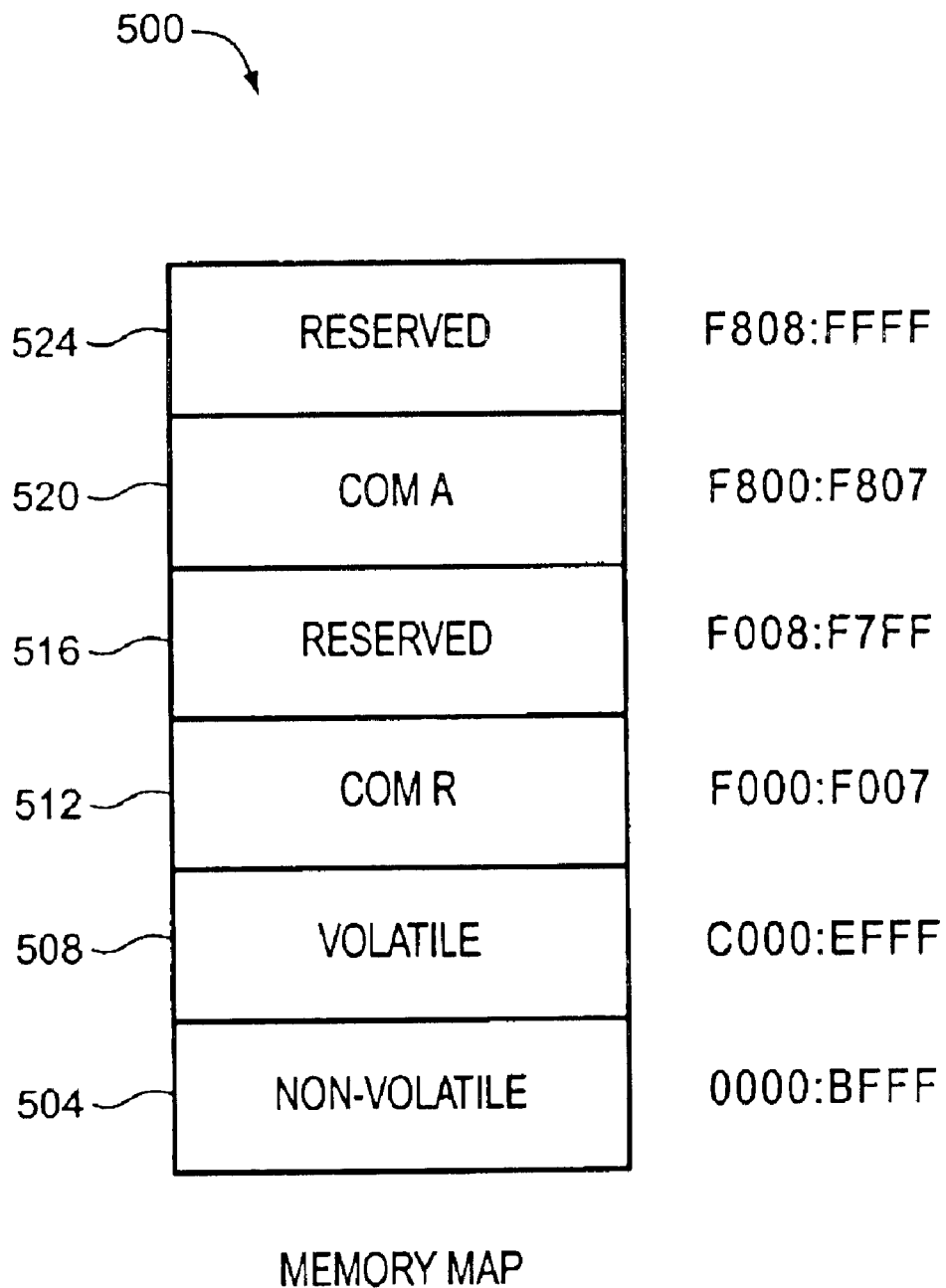
FIG. 5 is a memory map of a presently preferred embodiment of the present inventions.

FIG. 5 shows a memory map for 65 kilobytes of address space. The lower 49 kB address space 504 is for the non-volatile memory 424, the next 12 kB of address space 508 is for volatile memory 428, followed by 8 bytes of address space 512 for the first interface 328, followed by 2 kB of address space 516 of reserved memory, 8 bytes of address space 520 for the second interface 336, and another 2 kB of address space 524 for reserved memory.

Figure 6A:
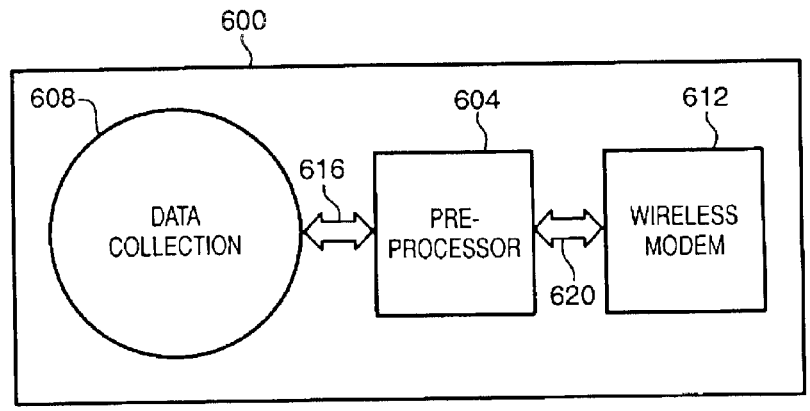
FIGS. 6A–C are block diagrams of embodiments of the present inventions including a user equipment.
Figure 6B:
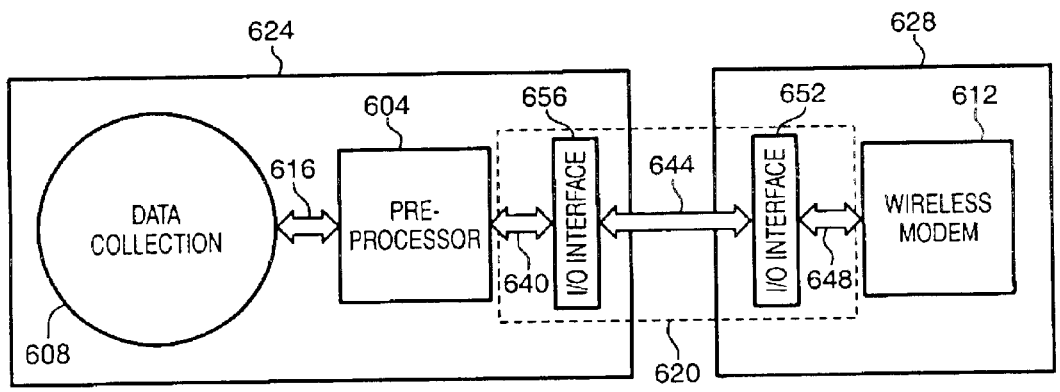
Figure 6C:
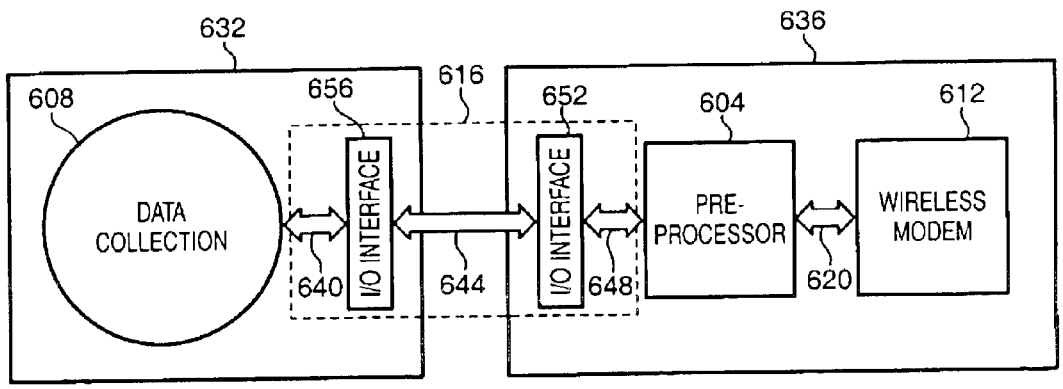

FIGS. 6A–C depict various physical embodiments of the present inventions interfaced with user equipment (e.g., data collection unit 608). FIG. 6A shows a single user equipment 600 comprising a data collection unit 608 (e.g., an automatic meter reader), a preprocessor 604 and a wireless radio 612. The preprocessor 604 is coupled to the data collection unit 608 via a first interface 616, and to the wireless radio 612 via a second interface 620.

FIG. 6B shows a user equipment 624 including the preprocessor 604. Here, wireless radio 612 is in a separate physical packaging 628. Here, the second interface comprises I/O interfaces 652 and 656 (e.g., RS-232 ports). The I/O interfaces 652 and 656 are connected via a serial cable 644. I/O interface 656 is coupled to preprocessor 604 via connector 640, and I/O interface 652 is coupled to wireless radio 612 via connector 648.

FIG. 6C shows a user equipment 632, which is similar to the system depicted in FIGS. 6A and 6B, however, the preprocessor 604 and wireless radio 612 are found in data terminal unit/module 636. The same interface described above with reference to FIG. 6B and the second interface 620 is shown in FIG. 6C. However, in FIG. 6C the components found in the second interface 620 are found in the first interface 616 instead. FIG. 6C is most like the data terminal module 100 and data terminal unit 200 shown in FIGS. 1 and 2 respectively.

An operational overview of the techniques of the present invention are now presented. Generally speaking, the preprocessor 604 is a hardware component that includes a software driver. As described above, the preprocessor 604 can have a dedicated piece of hardware that executes the software driver, however, it is also possible for the software driver to be overlaid into an existing piece of hardware as an additional component of the software stack. For example, the preprocessor driver can be added to the user equipment software stack or to the wireless radio software stack. The preprocessor driver, as it is referred to herein, is generally an interrupt driven service routine that first identifies the source of an interrupt and second determines what process or interrupt service routine to execute based on any of the data accompanying the interrupt (or the interrupt itself).

It should be noted that the incoming data is preferably serial ASCII character data. Commands are preferably based on the well-known Hayes modem AT Command set, although additional special codes can be added to identify particular functionality described herein. Some of these codes are described below with references to Table 2.

According to one embodiment, the primary components of the preprocessor driver are saved in non-volatile memory 424 (e.g., section 504 of memory map 500) and are executed by microcontroller 404 as a sequence of instructions stored in a computer-readable format. For example, the sequences of instructions (e.g., op codes) are loaded into data and control registers within the microcontroller 404 from the non-volatile memory 424 (alternatively, the instructions can be copied from non-volatile memory 424 to a volatile execution memory before being executed). The sequences of instructions cause the microcontroller 404 in the preprocessor 300 to perform a series of acts based upon a combination of the sequences of instructions and the data received from the serial data interface (e.g., UART 416). Program variables needed by the preprocessor driver are either stored in available registers internal to the microcontroller 404, or they are stored in volatile memory 428.

Two state diagrams are described below with reference to FIGS. 7A–B. The descriptions are general and are further supported by the detailed flowcharts described below with reference to FIGS. 8–12.

Figure 7A:
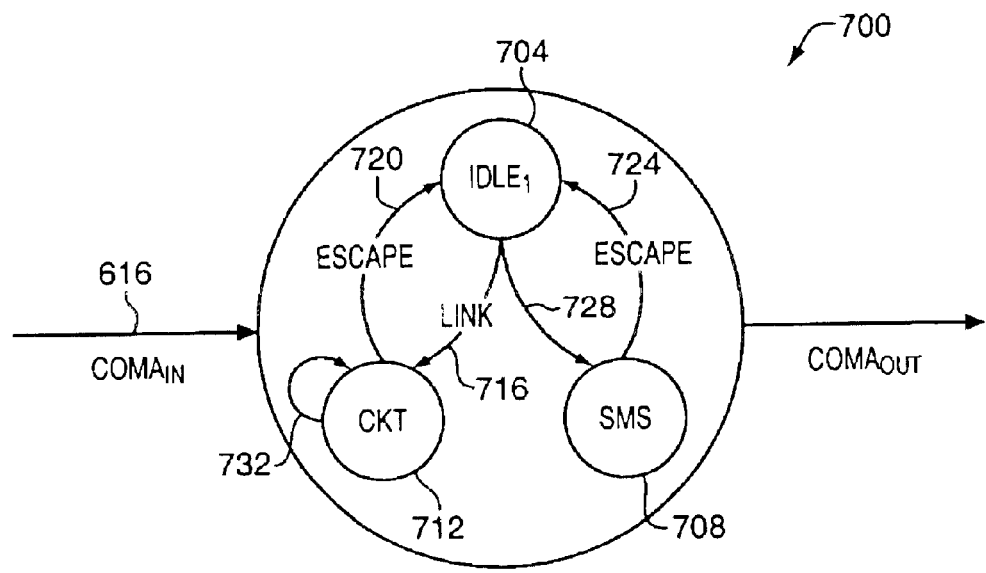
FIGS. 7A–B depicts state diagrams for two of the interrupt service routines of the present inventions.

A state diagram 700 for the first interface interrupt service routine is shown in FIG. 7A. The default state is IDLE mode 704. In the IDLE mode 704, characters are received over the first interface 616 and tested for commands or events that trigger a state change, for example link commands 716 and 728. If a command or event indicating a state change is not detected then the data characters are stored in a memory buffer until a state change does occur.

The circuit ("CKT") mode 712 passes data from the first interface 616 directly to the second interface 620, with little intervention from the preprocessor 604, except to monitor for commands or events that may trigger another state change (e.g., an escape sequence). In the circuit mode 712, an active virtual link is maintained between the wireless radio 612 and a public telephony switched network ("PSTN") over a wireless local loop. The circuit mode 712 is maintained until an escape sequence 720 is detected. However, if a re-enter command 732 is detected following the escape sequence 720, then the interrupt service routine will return to the circuit mode 712 and not to IDLE mode 704.

The short message service ("SMS") mode prepares and sends SMS messages comprising the data stored in the memory buffer from the first interface 616, over the second interface 620, and through the wireless radio 612. From the wireless radio 612, the SMS messages are carried over the GSM network and are then routed over other intervening networks to their ultimate destination.

SMS messages generally have a 140 byte data structure. The first byte indicates an SMS message type, the second byte indicates the SMS message length, and the last 138 bytes comprise the SMS message body. The SMS message body comprises either character data, or commands, or both. The SMS messages types are described in Table 1.

TABLE 1

| | |
|---|---|
| establish link | requests that a virtual link be established for SMS data transfer |
| link established | a reply to an establish link message indicating that the link is setup (the sending or receipt of this message causes the mode to change to SMS mode) |
| data link | all data is transferred using this message type |
| disconnect link | requests that a link be disconnected (the sending or receipt of this message causes the mode to change to IDLE mode) |
| link disconnected | a reply to the disconnect link message |

An escape sequence 724 causes the state to return from SMS mode 708 to IDLE mode 704.

Figure 7B:
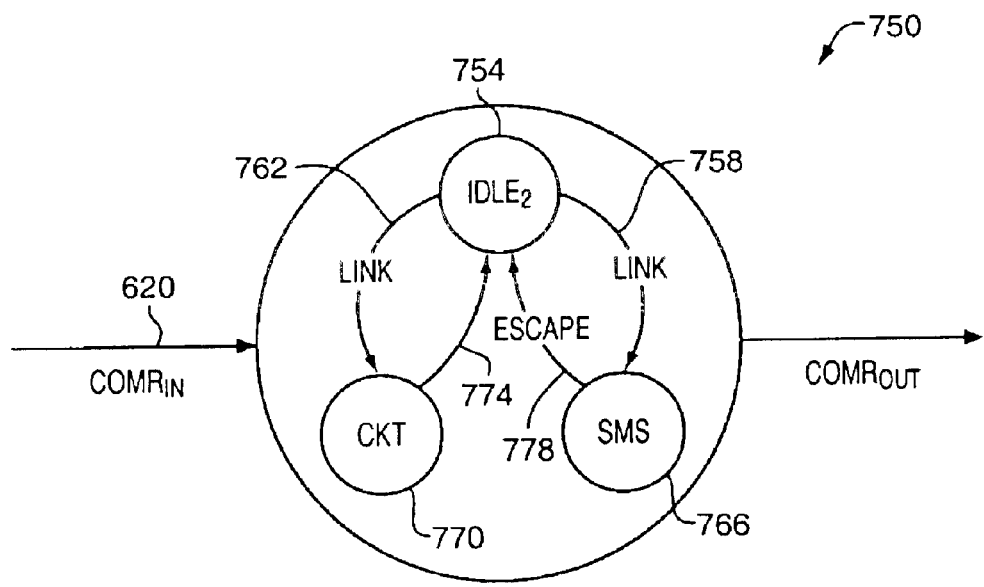

State diagram 750, shown in FIG. 7B, depicts the states associated with the second interface interrupt service routine. The states described above with reference to the first interface interrupt service algorithm are substantially similar to those associated with the second interface interrupt service algorithm, the primary difference being that if an interrupt was received over the second interface, then it is not from the user equipment (e.g., data collection 608), but rather from remote equipment beyond the wireless radio 612.

In IDLE mode 754, data characters received at the second interface 620 (e.g., COMR 308) are passed straight through the first interface 616 (e.g., COMA 304). The data characters are, however, monitored for a link command 758 or 762, which indicate a state change to SMS mode 766 or CKT mode 770, respectively. Escape sequences 774 and 778 return the service routine to IDLE mode 754 from CKT mode 770 or SMS mode 766.

Figure 8:
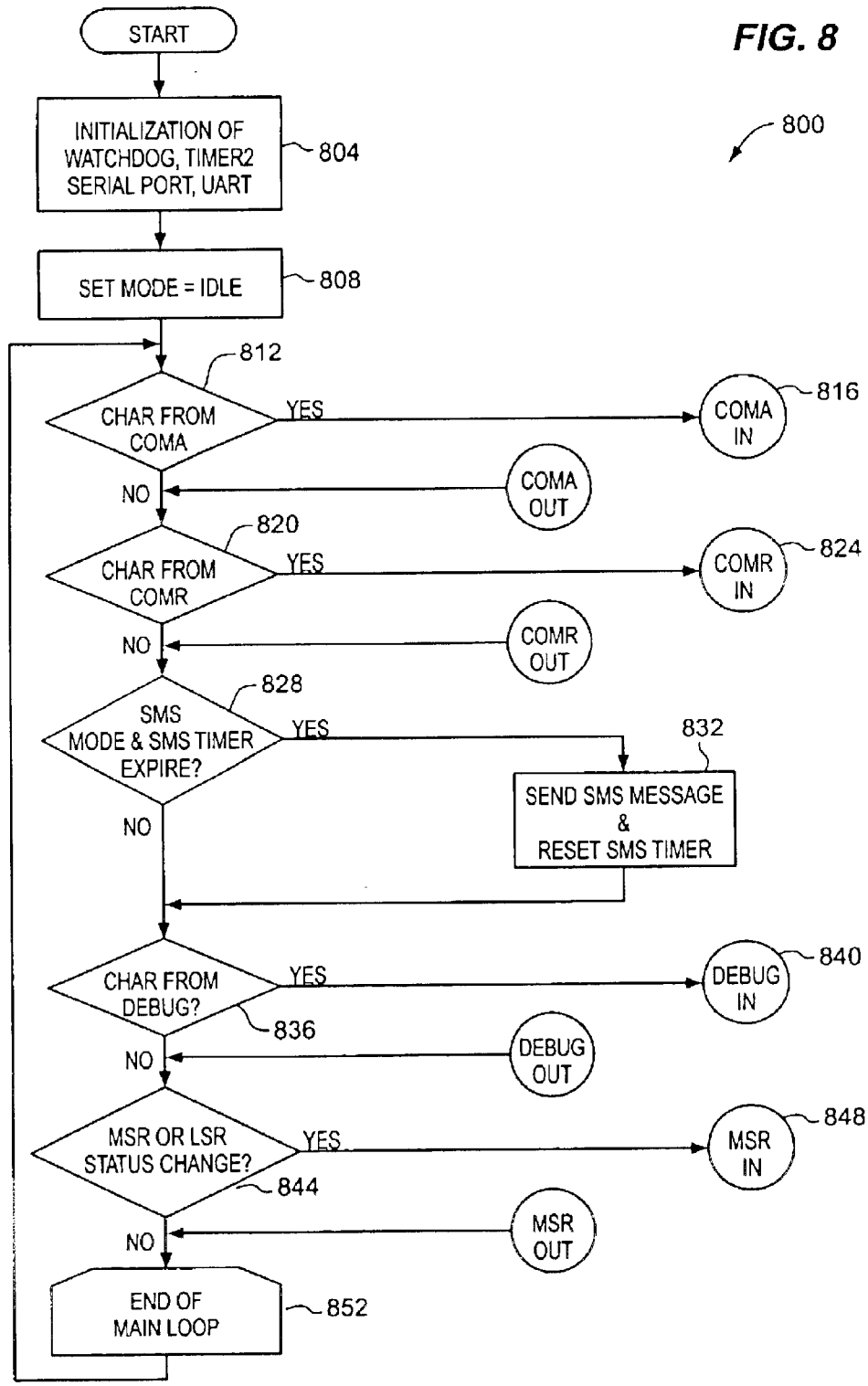
FIG. 8 is a flowchart depicting a main loop for a preprocessor driver.

FIG. 8 depicts the main loop 800 for the preprocessor driver. The main loop 800 begins by first initializing various operating parameters. For example, in act 804, a watchdog timer, a second timer, the serial ports, and the UART 416 are initialized.

The watchdog timer is designed to reset the preprocessor 604 in the event that the software stalls or a processing error occurs. Preferably, the duration of the watchdog timer is set to 4.5 seconds. A second timer is used to extend the 4.5 second timeout for routines that take longer than the first watchdog timer. The second timer generates a 2 millisecond interrupt.

The serial ports (e.g., COMA 304 and COMR 308) are initialized to operated at 9600 baud, 8 data bits, 1 stop bit, and no parity, and the UART 416 is initially setup to run at 9600 baud. Memory buffer input queues have 1024 bytes each and store data characters received through COMR 308 and COMA 304.

Next, in act 808, the mode of the main loop is set to IDLE (e.g., for both the first interface 616 and the second interface 620). After act 808, the interrupt service routine processing begins.

In act 812, if an interrupt was received at the first interface 616, then an exception occurs and processing continues to the first interface interrupt service routine in act 816, which is described above with reference to FIG. 7A and below with reference to FIG. 9.

In act 820, if an interrupt was received at the second interface 620, then an exception occurs and processing continues to the second interface interrupt service routine in act 824, which is described above with reference to FIG. 7B and below with reference to FIG. 10.

In act 828, a test is performed to determine whether the elapsed time since the last data character was received over the first interface 616 (e.g., through COMA 304) when the first interface interrupt service routine is in SMS mode 708. The test is referred to as the SMS timer expire event. If the SMS timer event has occurred, then in act 832 the memory buffer is prepared for SMS transmission, the SMS message is transmitted and the SMS timer is reset. Processing continues to act 836.

Figure 11:
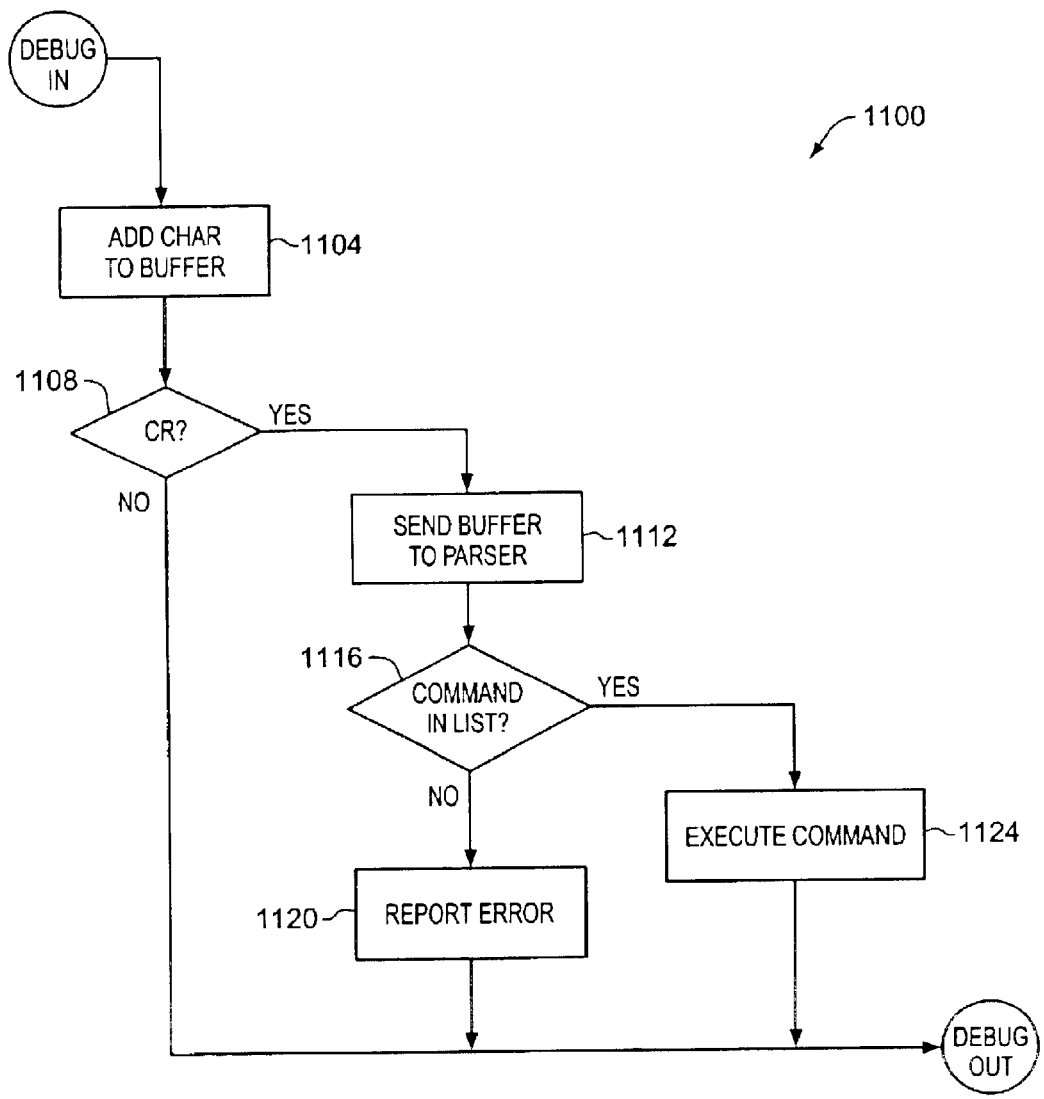

In act 836, if an interrupt was received at the third interface (e.g., debug interface 312 depicted in FIG. 3) then the debug interrupt service routine described below with reference to FIG. 11 is performed in act 840.

In act 844, a test is performed to determine whether values of a modem status register or a line status register (taken from wireless radio 612 by UART 416), have been updated. If either has been updated, then processing continues to act 848, described below with reference to FIG. 12. After, alternatively, acts 844 or 848, the process continues to act 852, at which point the loop is restarted at act 812.

Figure 9:
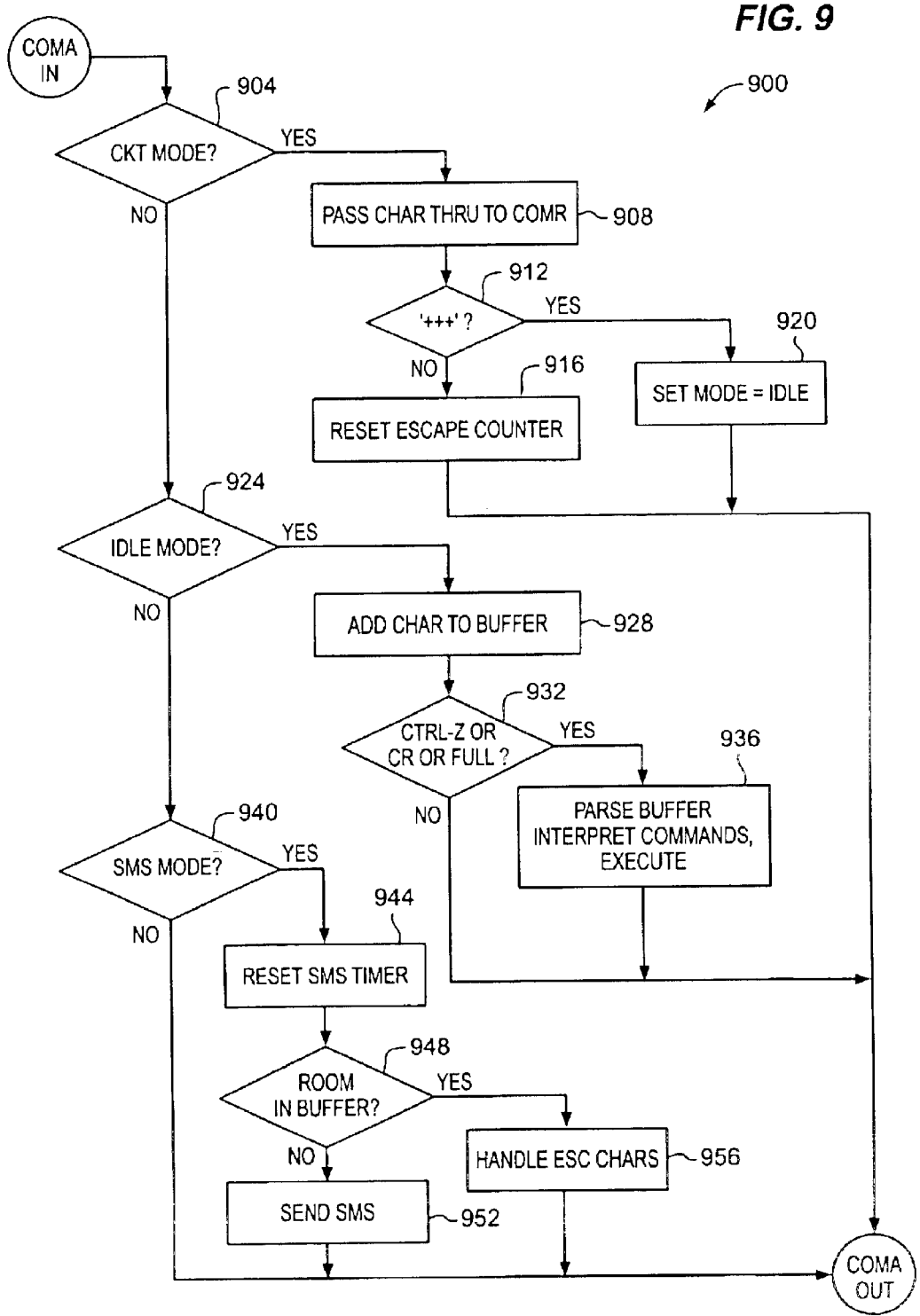
FIGS. 9–12 are flowcharts depicting interrupt service routines for the preprocessor driver.

FIG. 9 is a flowchart depicting the acts performed by the preprocessor driver when servicing an interrupt over the first interface 616. More specifically, the flowchart depicts the first interface interrupt service routine 900, which services interrupts from the user equipment (e.g., data collection 608).

In act 904, a test is performed to determine whether the present mode is CKT mode 712. If the mode is CKT mode 712, then the data received by the first interface 616 is passed through to the second interface 620 at act 908.

In act 912, a test is performed to determine whether an escape sequence was received. In particular, the test determines whether the character sequence "+++" was received through the first interface 616. If the escape sequence was not received, then in act 916 the escape sequence counter is reset. However, if the escape sequence was received, then in act 920, the mode is set to IDLE mode 704. The preprocessor driver then returns to the main loop, namely act 820.

In act 924, a test is performed to determine whether the present mode is IDLE mode 704. If the present mode is IDLE mode 704, then the incoming data character from the first interface 616 is added to a memory buffer. Next, in act 932, a test is performed to determine whether a process trigger (e.g., a carriage return, a CTRL-Z, or the memory buffer is full) has occurred. If a process trigger has occurred, then in act 936, the memory buffer is parsed, interpreted and the appropriate acts performed. A list of exemplary interpreted strings and their results is shown in Table 2.

TABLE 2

| | |
|---|---|
| AT-EMU | sets non-volatile memory to reflect the simulation mode — 0 indicates no simulation, 1 indicates simulated circuit switch |
| ATDnnnnnnn | sends an establish link SMS message to phone number nnnnnnn (when AT-EMU set to 1) |
| ATH | sends a disconnect link SMS message to the phone number established using the ATD command (when AT-EMU set to 1) |
| ATS7? | returns the value 30 to the first interface 616 |
| AT0 | returns to CKT mode if the carrier detect signal on the wireless radio 612 is still asserted |
| AT + IPR = xxxx | changes the baud rate on the wireless radio 612 and on both ports on the preprocessor 604 to xxxx (2400, 9600) |
| AT? | displays this table to the debug port |

It is noted that the AT-EMU command sets the simulation mode for the unit. This is important because the unit is capable of providing both true circuit switched calls or simulated circuit switched calls. Accordingly, if the mode is set to no emulation, then the ATD and ATH commands will operate as setup/control functions for a truly circuit switched call. However, when the mode is set to simulated circuit switched mode, the functions are unique—as described above.

After act 936, the preprocessor driver returns to act 820.

In act 940, a test is performed to determine whether the present mode is SMS mode 708. If the present mode is SMS mode 708, then in act 944 the SMS timer is reset. In act 948, another test is performed to determine whether there is sufficient room in the memory buffer to store additional data. If there is not sufficient room, then in act 952 an SMS message is sent thereby flushing a portion of the memory buffer. If, however, there is sufficient room in the memory buffer, then in act 956 any escape characters are handled, for example the occurrence of the string "+++" through COMA 304. After handling the escape characters, the preprocessor driver returns to act 820.

Figure 10:
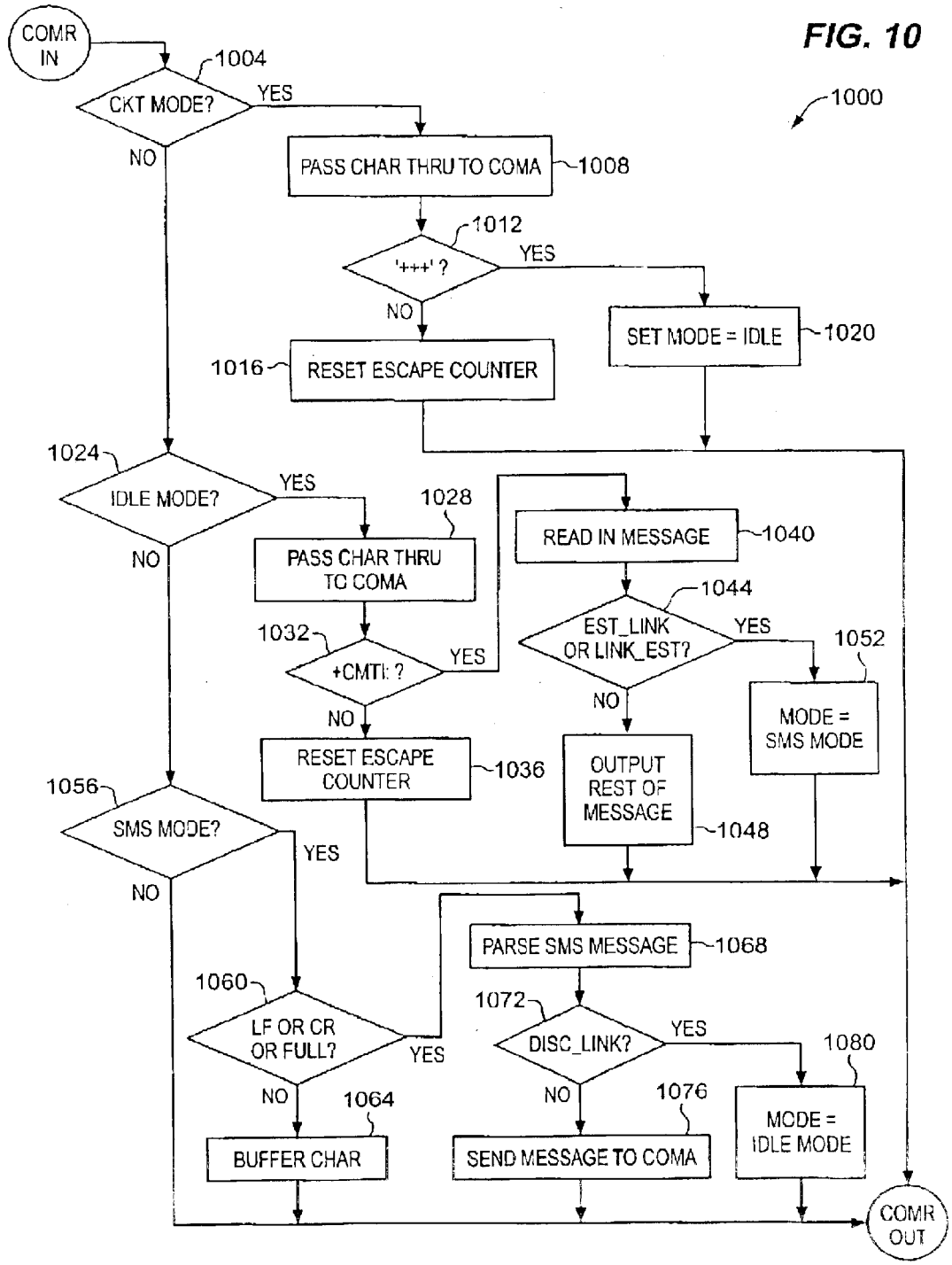

FIG. 10 is a flowchart depicting the acts performed by the preprocessor driver when servicing an interrupt over the second interface 620—i.e., the second interface interrupt service routine 1000.

In act 1004, a test is performed to determine whether the present mode is CKT mode 770. If the present mode is CKT mode 770, then any data characters received at the second interface 620 (e.g., COMR 308) are passed through the preprocessor 604 to the first interface 616 (e.g., to COMA 304) in act 1008. Next, in act 1012 a test is performed to determine whether an escape sequence has been received. According to one embodiment, the escape sequence is the receipt of three consecutive plus signs, or the string "+++". If the escape sequence is not found, then the escape counter is reset in act 1016. However, if the escape sequence is found, then the mode is set to IDLE mode 754 in act 1020. After acts 1016 or 1020, the preprocessor driver continues to act 828.

In act 1024, a test is performed to determine whether the present mode is IDLE mode 754. If the present mode is IDLE mode 754, then data characters received at the second interface 620 are passed through to first interface 616 in act 1028. In act 1032, a test is performed to determine whether a link sequence is found in the data characters. According to one embodiment, the link sequence is the string "+CMTI:", which indicates an incoming SMS message. If the link sequence is not detected, then the escape counter is reset at act 1036. However, if a link sequence was detected, then the inbound SMS message is read in act 1040.

Next, in act 1044, a second test is performed to determine whether another link sequence is found in the SMS message (e.g., in the SMS message type field). For example, the next link sequence can be the "establish link" or "link established" messages described above with reference to Table 1. If no establish link or link established messages is found, then the remainder of the SMS message is output to the first interface 616 in act 1048. However, if the establish link or link establish message is found, then the message is processed and the mode is set to SMS mode 766 in act 1052. The preprocessor driver then continues to act 828.

In act 1056, a test is performed to determine whether the present mode is SMS mode 766. If the present mode is SMS mode 766, then a test is performed in act 1060 to determine whether a parse trigger has been received. According to one embodiment, parse triggers include a line feed or a carriage return, as well as a "buffer full" indicator. If no parse trigger has been received, then in act 1064 the data character is stored in the memory buffer and processing continues to act 828. However, if a parse trigger has been received, then in act 1068, the SMS message is parsed.

In act 1072, a test is performed to determine whether the SMS message type is disconnect link. If the SMS message type is not disconnect link, then in act 1076, the SMS message type is sent to the first interface 616. However, if the SMS message is a disconnect link command, then the mode is set to IDLE mode 754 in act 1080. After step 1080, the preprocessor driver continues to act 828.

FIG. 11 is a flowchart depicting the debug interrupt service routine 1100. Under normal circumstances a third interface, shown in FIGS. 3 and 4, receives the debug interrupt. The debug interrupt is commonly associated with connecting a terminal device or laptop computer into the third interface 332. The debug interrupt service routine 1100 is used for setup and diagnostic purposes.

In act 1104, a data character received over the third interface 332 is added to the memory buffer. In act 1108, the data character is tested to determine whether it is a carriage return. If the data character is not a carriage return, then the routine returns to act 844. If the data character is a carriage return, then in act 1112 the memory buffer is parsed. In act 1116, a test is performed to determine whether a command from the memory buffer is in a command list (e.g., Table 2). If the command is not in the command list, then in act 1120 an error message is reported over the third interface 332. However, if the command is in the command list, then the command is executed in act 1124. Thereafter, processing continues to act 844.

Figure 12:
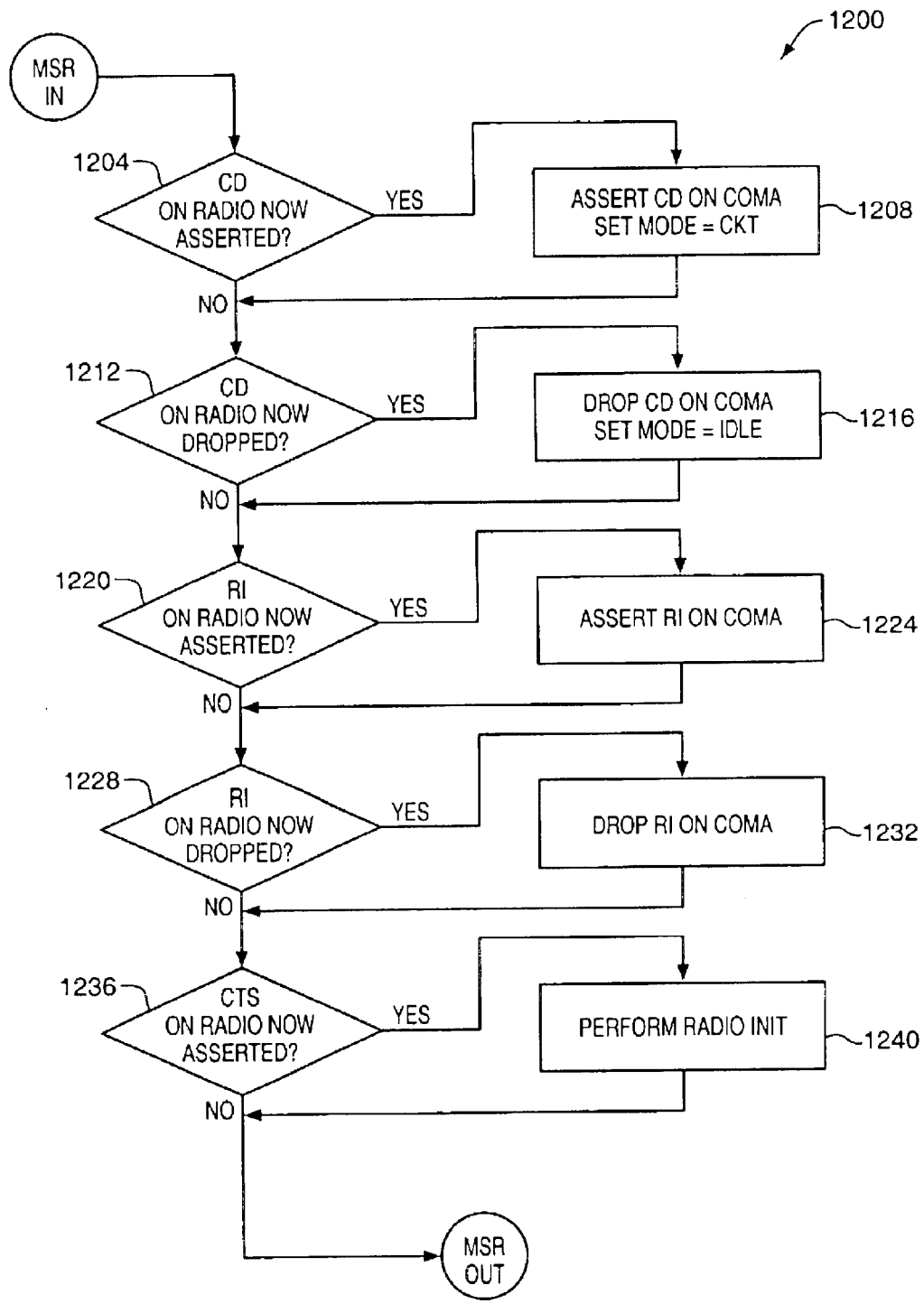

FIG. 12 depicts a flowchart 1200 for handling the modem status register ("MSR") and line status register ("LSR") values gathered from the first interface 616 and second interface 620. Essentially, a series of possible errors are analyzed and the appropriate action is taken, which includes, in some instances changing the preprocessor mode.

In act 1204, a test is performed to determine whether the carrier detect ("CD") is asserted on the second interface 620 (e.g., the wireless radio 612). If the carrier detect is asserted, then the carrier detect is asserted on the first interface 616 and the mode is set to the circuit mode in act 1208.

In act 1212, a test is performed to determine whether the carrier detect is dropped on the second interface 620. If the carrier detect is dropped, then in act 1216 the carrier detect is then dropped on the first interface 616 and the mode is set to the idle mode.

In act 1220, a test is performed to determine whether the ring indicator ("RI") is asserted on the second interface 620. If the ring indicator is asserted, then in act 1224 the ring indicator is asserted on the first interface 616.

In act 1228, a test is performed to determine whether the ring indicator is dropped on the second interface 620. If the ring indicator is dropped, then in act 1232 the ring indicator is dropped on the first interface 616 as well.

In act 1236, a test is performed to determine whether the clear-to-send ("CTS") is asserted on the second interface 620. If the clear-to-send is asserted, then in act 1240 the wireless radio 612 is initialized. After acts 1236 or 1240, the preprocessor returns to act 852.

The service routine embodied in flowchart 1200 is useful in that the service routine can change the mode of the preprocessor 604 at either the first interface 616 or the second interface 620, in response to certain physical conditions, namely the assertion or dropping of one of the lines used to complete a virtual circuit.

Application Layer Embodiment

According to another embodiment, special purpose simulation hardware (e.g., preprocessor 300 shown in FIG. 3) is not integrated with an existing GSM modem. Rather, the functionality described above is implemented by way of software added to the application layer of a standard GSM protocol stack 1500 shown in FIG. 15A. The same software can also be added to the general packet radio service (GPRS) protocol stacks 1580 (GPRS Class C) and 1590 (GPRS Class A), shown in FIGS. 15B and 15C, respectively. Like reference numerals in FIGS. 15A-C refer to like elements.

According to a presently preferred embodiment, the call setup and tear down functionality described above with reference to FIGS. 13A-C is performed by way of extensions to the application layer of the GSM protocol stack, for example, the GSM protocol stack already existing in a GSM modem.

In such an embodiment, computer-readable program code is compiled and loaded into a non-volatile storage medium. The code is later executed by one or more processors configured to handle the incoming AT commands from the user equipment or the wireless input in the form of SMS packets. The application layer extensions build a functional communications bridge for simulating circuit switched calls to the user equipment. An advantage of the application layer embodiment is that no special/single purpose hardware is required. Rather, functionality is added to an existing GSM modem by way of the software added to the GSM protocol stack.

Figure 15A:
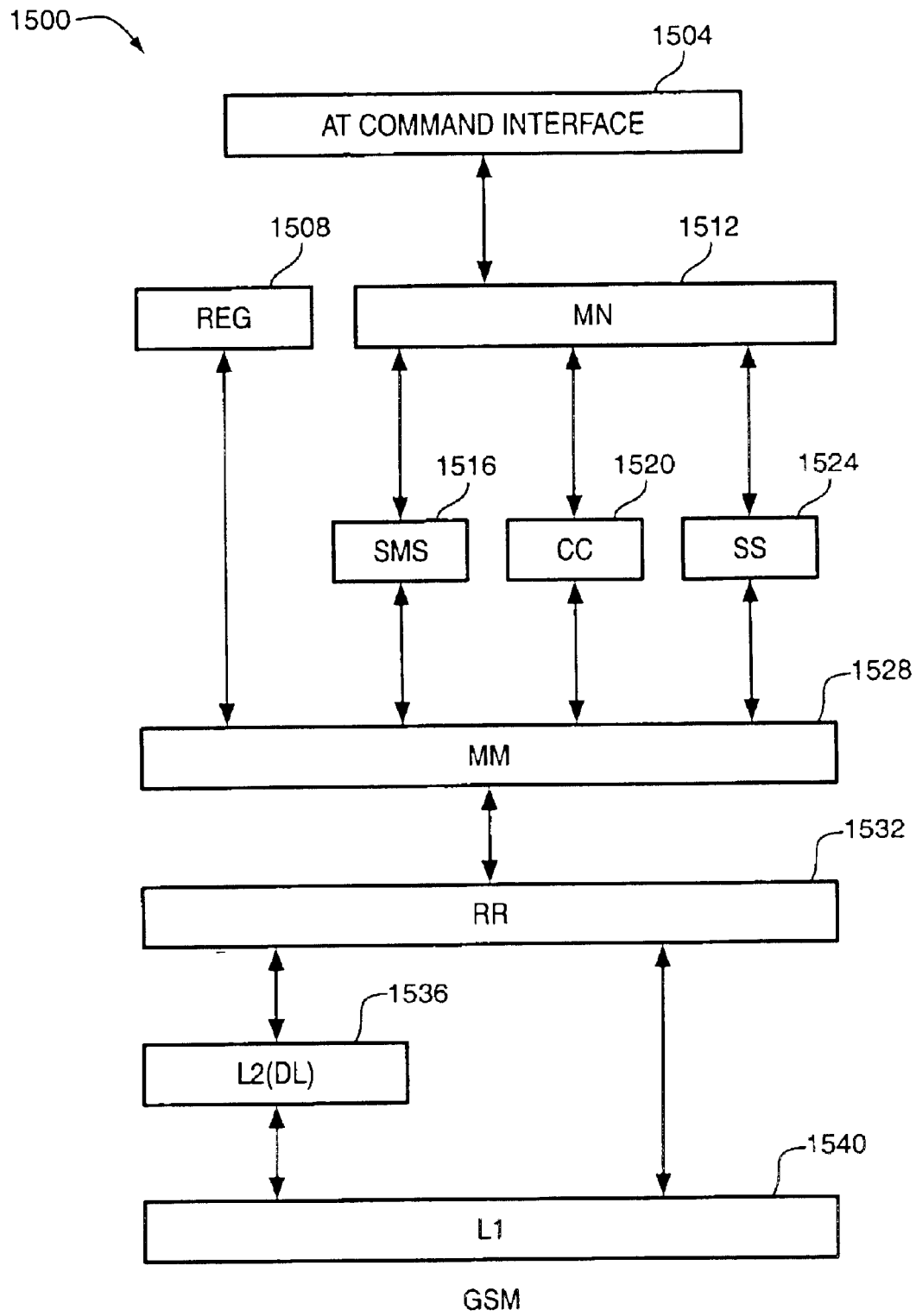
FIGS. 15A–C depict various protocol stacks used in embodiments of the present inventions.

FIG. 15A depicts a GSM protocol stack 1500. The base components of GSM protocol stack 1500 are generally known in the art. For example, the base software components of GSM protocol stack 1500 are available from various venders such as debis Systemhaus in Berlin, Germany, CONDAT Datensystem Gmblt in Hannover, Germany, and other wireless communications vendors. According to one embodiment, the GSM protocol stack 1500 can be implemented in a variety of logic devices or in computer readable code executed by an embedded processor already part of the GSM modem.

The present inventions are preferably embodied in software code that comprises the AT command interface 1504. The AT command interface is overlaid onto each of the various GSM protocol stacks 1500, 1580 and 1590. Commands, as described above with reference to Table 2, are thus bridged between the user equipment 1304 and the GSM protocol stack—and, hence, the GSM network 1320 (FIG. 13). It is further noted that the AT command interface 1504 can also include event detection and notification software that detects alarms from the user equipment and handles them appropriately—for example by initializing a simulated circuit switched or circuit switched call.

Referring to FIG. 15A, the user equipment 1304 sends data over a GSM network 1320 using the Hayes standard AT command interface 1504. The mobile network man machine interface (MN) 1512 receives the data and passes the data to the appropriate messaging service—e.g., a short message service (SMS) 1516, a call control service (CC) 1520, or a supplementary service (SS) 1524. A registration element 1508 will provide the mobility management layer 1528 with necessary information about the data and the network. From each of layers 1508, 1516, 1520 and 1524 data flow is then directed to and from the mobility management layer (MM) 1528.

Figure 14:
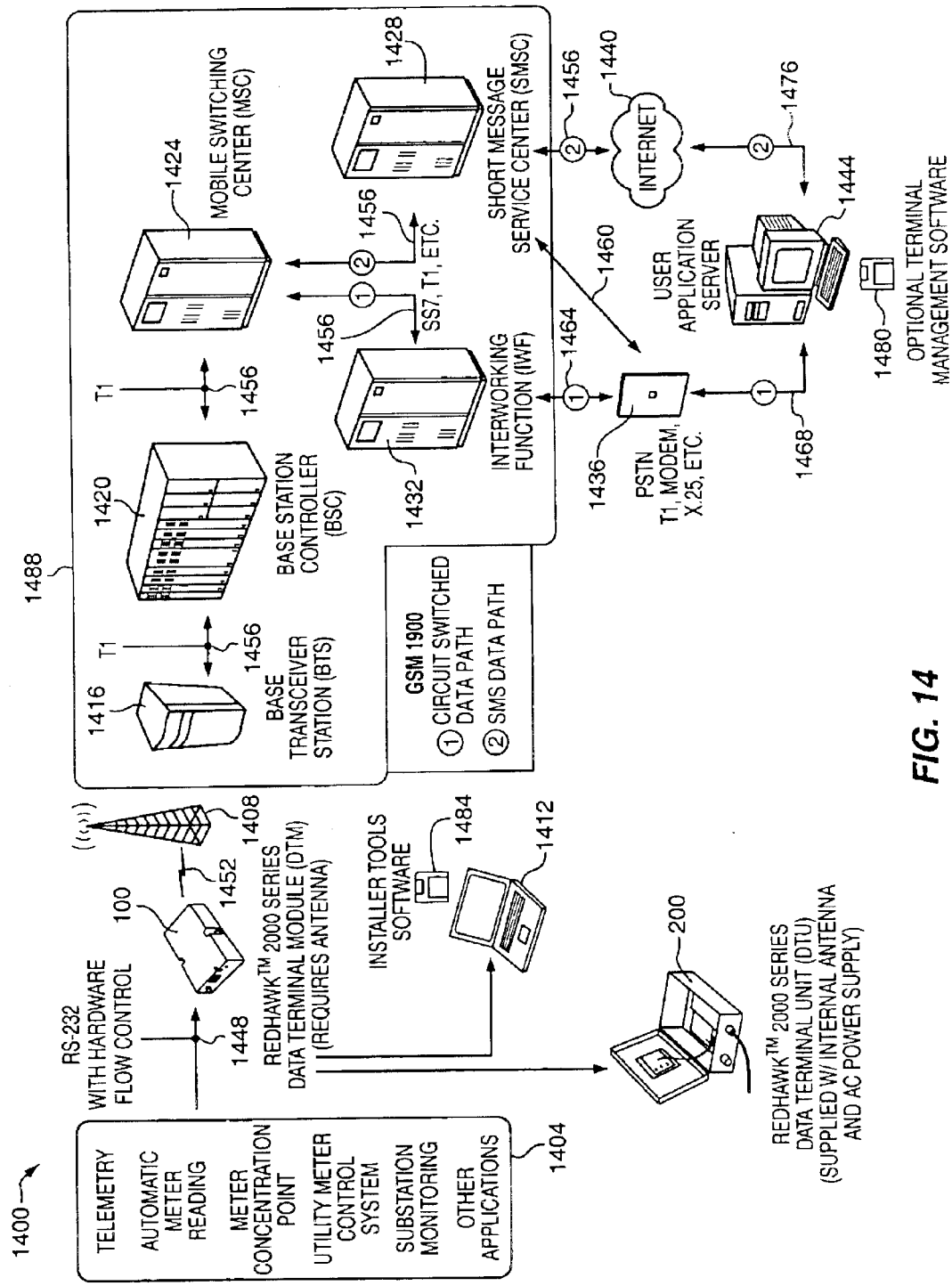
FIG. 14 is a block diagram of an network monitoring system employing the present inventions.

The mobility management layer 1528 establishes, maintains, and releases connections between the user equipment 1304 and the GSM network 1320. From the mobility management layer 1528, data and control is passed to the radio resource management layer (RR) 1532. The radio resource management layer 1532 establishes physical connections over the radio interface for call-related signaling and traffic channels between the user equipment 1304 and base station 1488 (FIG. 14).

Connected to the radio resource management layer 1532 is the physical layer (L1) 1540. The physical layer 1540 processes call-related signaling and traffic channels directly from the radio resource layer 1532, and also processes the data sent from the data link layer (L2) 1536.

Figure 15B:
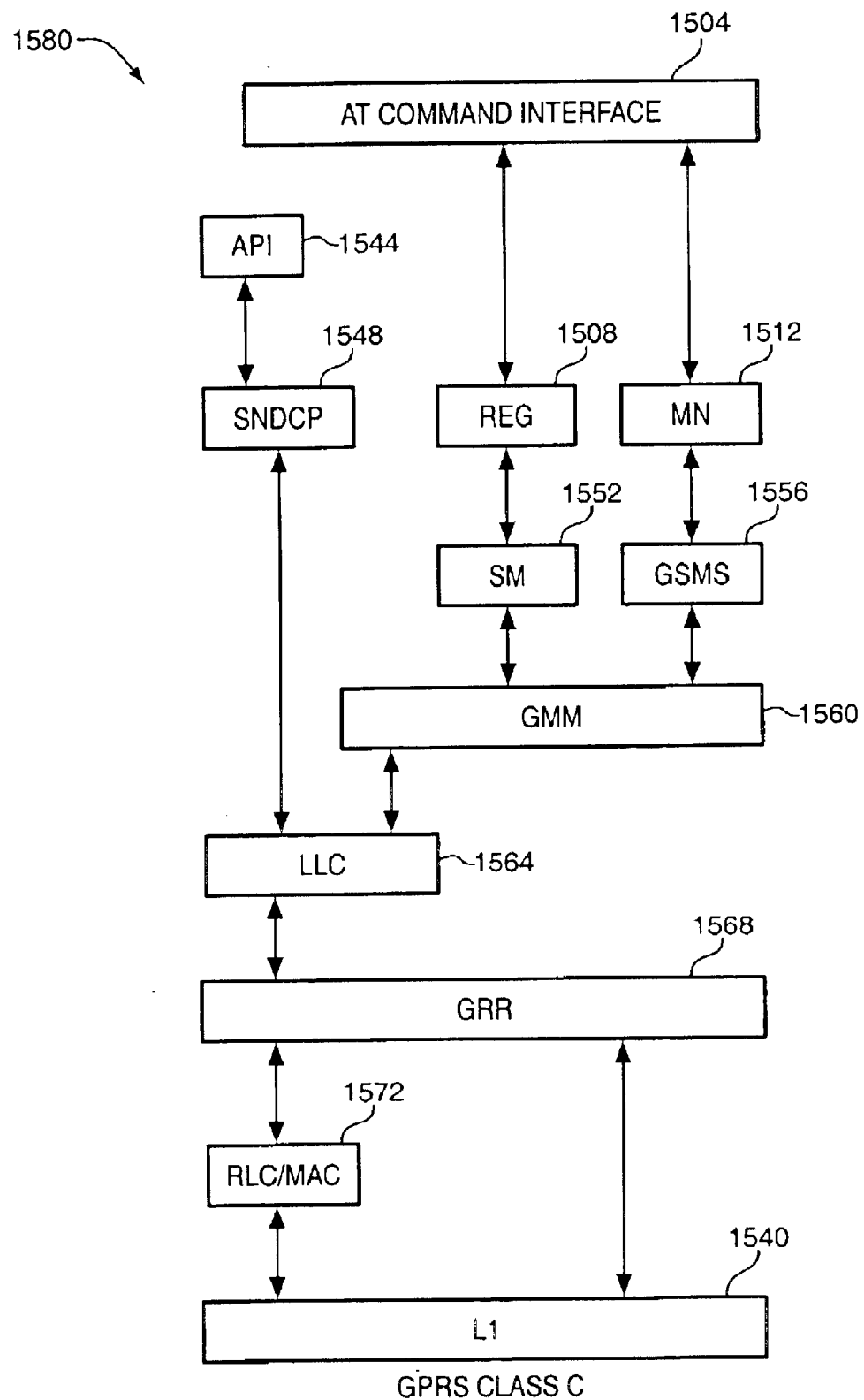

FIG. 15B is substantially similar to FIG. 15A, however, the "G" notation in the protocol stack layers indicates that the designated layers now refer to a general packet radio service (GPRS). GPRS uses a packet radio principle and can be used for carrying packet data protocol between the user equipment 1304 and the GSM network 1320. GPRS provides additional services beyond what is offered with the standard GSM network, for example, GPRS can provide increased over-the-air data transfer rates and packet lengths.

An application program interface (API) 1544 is added to allow an application to control the subnetwork dependent convergence protocol (SNDCP) 1548, which is responsible for segmentation and re-assembly of the data packets, encryption and decryption, and transmission control protocol (TCP) header and data compression.

Layers interfacing the AT command interface 1504 include the registration layer 1508 and man-machine interface layer 1512, which in turn interface the SM layer 1552 and GSMS (GPRS short message service) 1556. The SM layer 1552 and GSMS layer 1556 interface the GPRS mobility management (GMM) layer 1560, and both the GMM and SNDCP layer 1548 interface the link layer control (LLC) 1564, which handles the link layer information of the packet data.

Link layer control 1564 interfaces the GPRS resource management layer (GRR) 1568. GPRS resource management layer 1568 in turn interfaces medium access control/radio link control (RLC/MAC) layer 1572, which handles the physical link processing, as well as physical layer 1540.

Figure 15C:
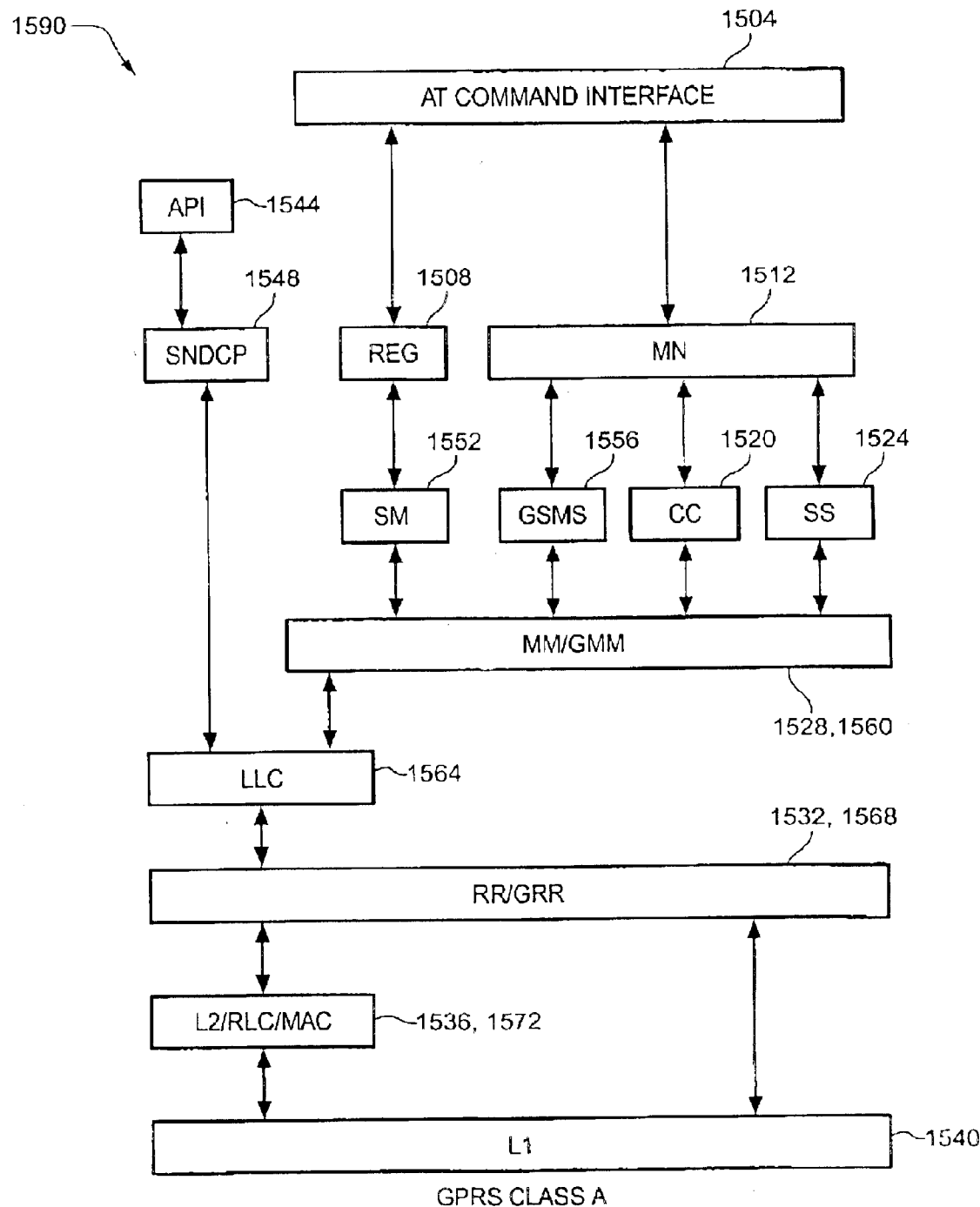

FIG. 15C shows the GPRS Class A protocol stack 1590. The protocol stack 1590 is a merge of the GSM protocol stack 1500 (FIG. 15A) and the GPRS Class C protocol stack 1580 (FIG. 15B), which is denoted by the dual reference numbers annotating the various layers of the protocol stack. The GPRS Class A protocol stack can operate standard GPRS and other GSM services simultaneously.

Data Collection System

FIG. 14 depicts an alternative system 1400 employing the present invention. User equipment 1404 comprises an application program, for example a telemetry, automatic meter reading, meter concentration point, utility meter control system, substation monitoring, home network control system, or other application. In particular, the present inventions can be used in conjunction with an event detection and notification application, such a fire alarm, gas alarm, burglar alarm, vending machine alarm, or another condition indicating a change of state of the user equipment 1404, or some other device connected thereto.

An RS-232 interface 1448 with hardware flow control connects user equipment 1404 to data terminal module 100, or alternatively data terminal unit 200. Data terminal module 100 and data terminal unit 200 preferably comprise a debug port through which terminal equipment or a laptop computer 1412 can interface and perform installation or testing services with software tools 1484. Optionally, the debug and configuration service can be accessed through the first interface 616.

The data terminal module 100 and data terminal unit 200 communicate via a wireless radio 1452 to one or more antenna relays 1408. Preferably the wireless radio 1452 is a GSM type modem. The wireless radio 1452 is configured to transmit and receive information between said terminal module 100, or data terminal unit 200 and GSM network 1488.

At least one of the one or more antennas relays 1408 is connected to a base transceiver station ("BTS") 1416. The base transceiver station 1416 processes the inbound wireless data (e.g., forms data packets for the inbound wireless data) and routes it over a T1 line 1456 (or other leased line) to base station controller ("BSC") 1420. The base station controller 1420 authenticates service for the data terminal unit/module and directs the processed inbound wireless data over T1 line 1456 to a mobile switching center ("MSC") 1424. The mobile switching center 1424 directs the processed inbound wireless data over a lease line 1456 to an appropriate networking station, for example an interworking function ("IWF") 1432, such as a PSTN bridge/router in the case of a circuit switched data path (identified by label "1"), or a short message service center ("SMSC") 1428, in the case of a short message service data path (identified by label "2").

If the data path is a circuit switched data path, then from the interworking function 1432 the processed wireless data is passed over a public switched telephony network ("PSTN") 1436 to circuit switched data interface 1436. If, however, the data path is a short message service data path, then the short message service center 1428 can route the processed wireless data over a PSTN connection 1460 to interface 1436, or over an packet switched network 1456 connected to an internet 1440. In the case of routing over the internet 1440, the short message service center 1428 handles all Internet Protocol packetization according to known Internet Protocol standards, such as publicly available Internet RFC 791, which is incorporated herein by reference in its entirety.

A user application server 1444 retrieves the inbound wireless data from the PSTN interface 1436 via a modem connection 1468. Alternatively, the user application server 1444 retrieves the inbound wireless data via an internet access/service provider 1476 connected to internet 1440.

Optional terminal management software 1480 can be used by the user application server 1444 to provide outgoing data, command, or setup services from the user application server 1444 to the user equipment 1404 (though the data terminal module 100 or data terminal unit 200) in a reverse path as is described above.

The methods, techniques and apparatuses described herein are advantageous over prior data collection, monitoring and control equipment in that an application specific communication infrastructure is not needed. Rather, the inventions can be utilized with existing wireless communication networks, and especially with GSM networks supporting short message services. Moreover, the present inventions provide a system that minimizes service personnel physical intervention in the acquisition of measured data from user equipment. In the systems described herein, measured data can be collected remotely via user application server direct polling or by present or programmed intervals within the preprocessor unit. This represents a significant improvement over historical extrapolation and stochastic methods of measured data collection.

The inventions are described herein by way of example and not by way of limitation. The written description and drawings are illustrative of preferred embodiments but not the only embodiments of the present invention. Accordingly, further embodiments of the invention will be apparent upon inspection of this specification by one of skill in the art. For example, the use of security or special identifiers to designate particular user equipment 1404, data terminal modules 100 or units 200, and terminal equipment 1412 can be employed to protect the system 1400 from unauthorized access. Additionally, other communications interfaces other than RS-232 can be employed in the present invention, for example, RS-485 and CEBus. Furthermore, the methods and techniques described above can be embodied in a distributed software environment wherein certain steps are performed by particular devices, or processing moved from the preprocessor to the user equipment or the wireless radio, or a combination of both.

What is claimed is:

1. A data collection system comprising:
   a GSM network;
   a user application server coupled to said GSM network;
   a data terminal apparatus including a communications bridge, a first interface, and a wireless radio, said wireless radio configured to connect to said GSM network; and
   a user equipment coupled to said data terminal apparatus through said first interface, said user equipment configured to collect and send data through said first interface as if said user equipment is communicating over a circuit switched call link; wherein:
   said communications bridge is configured to simulate said circuit switched call link to said user equipment and to communicate said data over said GSM network through said wireless radio using a non-circuit switched call link, and said GSM network is configured to route said data to said user application server for processing, and said communications bridge comprises application layer object code built over a GSM protocol stack associated with said wireless radio, said application layer object code being configured to handle incoming AT commands from said user equipment and handle said simulation of said circuit switched call link to said user equipment.

2. The data collection system of claim 1, wherein said non-circuit switched call link is made via one or more short message service messages.

3. The data collection system of claim 1, wherein said non-circuit switched call link is made via one or more general packet radio service messages.

4. The data collection system of claim 1, said communications bridge further comprising a preprocessor unit, said preprocessor unit comprising:

a microcontroller;

a non-volatile memory coupled to said microcontroller;

a volatile memory coupled to said microcontroller; and an input output controller coupled to said microcontroller, said input output controller including said first interface and a second interface, said wireless radio coupled to said microcontroller through said second interface.

5. The data collection system of claim 1, wherein said communications bridge is configured to packetize data received from said first interface into short message service format.

6. The data collection system of claim 1, wherein said communications bridge is configured to packetize data received from said first interface into general packet radio service format.

7. A method for collecting data over a GSM network comprising:

receiving data at a data terminal apparatus from a user equipment;

simulating a circuit switched call link response to said user equipment, wherein the simulation of the circuit switched call link is provided utilizing application layer object code built over a GSM protocol stack, the application layer object code being configured to handle incoming AT commands from said user equipment and handle said simulation of said circuit switched call link to said user equipment;

packetizing said received data into packets for transmission over a non-circuit switch call link to said GSM network;

transmitting said packetized data over said GSM network; and routing said packetized data through said GSM network to a user application server.

8. The method of claim 7, wherein said packets are short message service packets.

9. The method of claim 7, wherein said packets are general packet radio service packets.

10. A method for receiving information over a GSM network comprising:

transmitting a packet of information over said GSM network, said packet being intended for a user equipment;

receiving said packet of information at a data terminal apparatus;

establishing a simulated circuit switched call link between said data terminal apparatus and said user equipment, wherein the simulated circuit switched call link is provided utilizing application layer object code built over a GSM protocol stack, the application layer object code being configured to handle incoming AT commands from said user equipment and handle simulation of said circuit switched call link to said user equipment;

transforming said packet of information into serial data information; and sending said serial data information from said data terminal apparatus to said user equipment over said simulated circuit switched call link.

11. The method of claim 10, wherein said packet of information is in short message service format.

12. The method of claim 10, wherein said packet of information is in general packet radio service format.

13. A computer-readable medium having stored therein sequences of instructions for collecting data over a GSM network, said one or more sequences of instructions causing one or more processing to perform the acts of:

receiving data at a data terminal apparatus from a user equipment;

simulating a circuit switched call link response to said user equipment, wherein the simulation of the circuit switched call response to the user equipment is provided utilizing application layer object code built over a GSM protocol stack, the application layer object code being configured to handle incoming AT commands from said user equipment and handle simulation of said circuit switched call link to said user equipment;

packetizing said received data into packets for transmission over a non-circuit switch call link to said GSM network;

transmitting said packetized data over said GSM network; and routing said packetized data through said GSM network to a user application server.

14. The computer readable medium of claim 13, wherein said packets are short message service packets.

15. The computer readable medium of claim 13, wherein said packets are general packet radio service packets.

16. A computer readable medium having stored therein sequences of instructions for receiving information over a GSM network, said one or more sequences of instructions causing one or more processors to perform the steps of:

transmitting a packet of information over said GSM network, said packet being intended for a user equipment;

receiving said packet of information at a data terminal apparatus;

establishing a simulated circuit switched call link between said data terminal apparatus and said user equipment, wherein the simulated circuit switched call link is provided utilizing application layer object code built over a GSM protocol stack, the application layer object code being configured to handle incoming AT commands from said user equipment and handle simulation of said circuit switched call link to said user equipment;

transforming said packet of information into serial data information; and sending said serial data information from said data terminal apparatus to said user equipment over said simulated circuit switched call link.

17. The computer readable medium of claim 16, wherein said packet of information is in short message service format.

18. The computer readable medium of claim 16, wherein said packet of information is in general packet radio service format.

* * * * *